United States Patent
Colombo et al.

(10) Patent No.: US 10,386,519 B2
(45) Date of Patent: Aug. 20, 2019

(54) AUTOMATED NEAR SURFACE ANALYSIS BY SURFACE-CONSISTENT REFRACTION METHODS

(71) Applicant: Saudi Arabian Oil Company, Dhahran (SA)

(72) Inventors: Daniele Colombo, Dhahran (SA); Federico Miorelli, Vedano al Lambro (IT)

(73) Assignee: Saudi Arabian Oil Company, Dhahran (SA)

( * ) Notice: Subject to any disclaimer, the term of this patent is extended or adjusted under 35 U.S.C. 154(b) by 130 days.

(21) Appl. No.: 15/361,671

(22) Filed: Nov. 28, 2016

(65) Prior Publication Data

US 2017/0176617 A1 Jun. 22, 2017

Related U.S. Application Data

(60) Provisional application No. 62/269,312, filed on Dec. 18, 2015.

(51) Int. Cl.
| | | |
|---|---|---|
| *G01V 1/00* | (2006.01) | |
| *G01V 1/28* | (2006.01) | |
| *G01V 1/36* | (2006.01) | |

(52) U.S. Cl.
CPC .............. *G01V 1/364* (2013.01); *G01V 1/362* (2013.01); *G01V 2210/24* (2013.01); *G01V 2210/322* (2013.01); *G01V 2210/53* (2013.01)

(58) Field of Classification Search
CPC .............................. G01V 1/364; G01V 1/362
USPC .......................................................... 702/17
See application file for complete search history.

(56) References Cited

U.S. PATENT DOCUMENTS

| | | | | |
|---|---|---|---|---|
| 3,731,269 A | * | 5/1973 | Judson .................. | G01V 1/362 367/40 |
| 4,577,298 A | * | 3/1986 | Hinkley ................. | G01V 1/362 367/38 |
| 5,073,876 A | | 12/1991 | Propes | |

(Continued)

FOREIGN PATENT DOCUMENTS

| | | |
|---|---|---|
| CN | 104181599 A | 12/2014 |
| EP | 0995133 B1 | 12/2003 |

OTHER PUBLICATIONS

English translation of CN 104181599, Dec. 3, 2014. (Year: 2014).*

(Continued)

*Primary Examiner* — Michael P Nghiem
(74) *Attorney, Agent, or Firm* — Bracewell LLP; Constance G. Rhebergen; Albert B. Kimball, Jr.

(57) ABSTRACT

A surface-consistent refraction analysis automatically derives near surface corrections during seismic data processing. Residual time lags are evaluated in multiple CMP-offset-azimuth bins by similarity analysis with a pilot trace where a correlation window is centered at the refracted arrival. The similarity analysis may take the form of computerized cross-correlation, or other criteria such as semblance. The residuals are then used to build a system of linear equations that is simultaneously inverted for surface-consistent shot and receiver time shift corrections plus a possible subsurface residual term. The refraction analysis steps are completely automated and require a fraction of the time needed for conventional near surface analysis.

24 Claims, 14 Drawing Sheets

(56) References Cited

U.S. PATENT DOCUMENTS

| | | | | |
|---|---|---|---|---|
| 5,508,914 A | * | 4/1996 | Lee | G01V 1/362 367/68 |
| 5,684,754 A | * | 11/1997 | Byun | G01V 1/362 367/21 |
| 5,920,828 A | | 7/1999 | Norris et al. | |
| 6,016,287 A | | 1/2000 | Klebba et al. | |
| 6,188,964 B1 | | 2/2001 | Reister et al. | |
| 6,208,587 B1 | * | 3/2001 | Martin | G01V 1/288 367/41 |
| 6,697,737 B2 | | 2/2004 | Jones et al. | |
| 6,757,616 B1 | | 6/2004 | Emmons et al. | |
| 7,675,813 B2 | | 3/2010 | Valero et al. | |
| 9,435,903 B2 | | 9/2016 | Valero | |
| 9,625,610 B1 | * | 4/2017 | Selman | G01V 1/40 |
| 10,067,255 B2 | * | 9/2018 | Colombo | G01V 1/362 |
| 2002/0075759 A1 | * | 6/2002 | Zhou | G01V 1/362 367/38 |
| 2004/0015297 A1 | * | 1/2004 | Dubois | G01V 1/362 702/14 |
| 2004/0022126 A1 | * | 2/2004 | Bernth | G01V 1/303 367/72 |
| 2006/0262645 A1 | | 11/2006 | Van Baaren | |
| 2009/0299637 A1 | | 12/2009 | Dasgupta | |
| 2010/0228530 A1 | | 9/2010 | Valero et al. | |
| 2011/0096626 A1 | | 4/2011 | Zhu et al. | |
| 2012/0106293 A1 | | 5/2012 | Yilmaz | |
| 2013/0176823 A1 | | 7/2013 | Le Meur et al. | |
| 2014/0198605 A1 | | 7/2014 | Grion et al. | |
| 2017/0068008 A1 | * | 3/2017 | Colombo | G01V 1/362 |
| 2017/0176621 A1 | | 6/2017 | Valero et al. | |

OTHER PUBLICATIONS

International Search Report and Written Opinion for related PCT application PCT/US2016/066262 dated Apr. 11, 2017.

Shi et al., "A Layer-Stripping Method for 3D Near-Surface Velocity Model Building Using Seismic First-Arrival Times", Journal of Earth Science, 2015, pp. 502-507, vol. 26, No. 4, China University of Geosciences and Springer-Verlag Berlin.

Burnstad, "New Concepts in Quality Control for 3D Near Surface Modeling", SEG Houston International Exposition and Annual Meeting, 2009, pp. 3203-3207.

Cambois et al., "Surface-consistent deconvolution in the log/Fourier domain", Geophysics, 1992, pp. 823-840, vol. 57, No. 6, Society of Exploration Geophysicists.

International Search Report and Written Opinion for related PCT application PCT/US2016/049248 dated Dec. 5, 2016.

Keho et al., "Focus on land seismic technology: The near-surface challenge", The Leading Edge, 2012, pp. 62-68.

Khan, "Artificial intelligence based automated first bereak pickiing and quality control", SEG/San Antonio Meeting, 2007, p. 1103-1107.

Sabbione et al., "Automatic first-breaks picking: New strategies and algorithms", Geophysics, 2010, pp. V67-V76, vol. 75, No. 4, Society of Exploration Geophysicists.

Saragiotis et al., "Near-surface Traveltime Tomographic Inversion Using Multiple first Break Picks", 75th EAGE Conference & Exhibition Incorporating SPE EUROPEC, 2013, pp. 1-5.

Taner et al., "A unified method for 2-D and 3-D refraction statics", Geophysics, 1998, pp. 260-274, vol. 63, Society of Exploration Geophysicists.

Taner et al., "Estimation and Correction of Near-Surface Time Anomalies", Geophysics, 1974, pp. 441-463, vol. 39, No. 4, Society of Exploration Geophysicists.

Taner et al., "Surface consistent corrections", Geophysics, 1981, pp. 17-22, vol. 46, No. 1, Society of Exploration Geophysicists.

Wiggins et al., "Residual Statics Analysis as a General Linear Inverse Problem", Geophysics, 1976, pp. 922-938, vol. 41, No. 5, Society of Exploration Geophysicists.

Zamorouev, "Automatic picking of seismic events", SEG Technical Program Expanded Abstracts, 1999, pp. 1-4.

\* cited by examiner

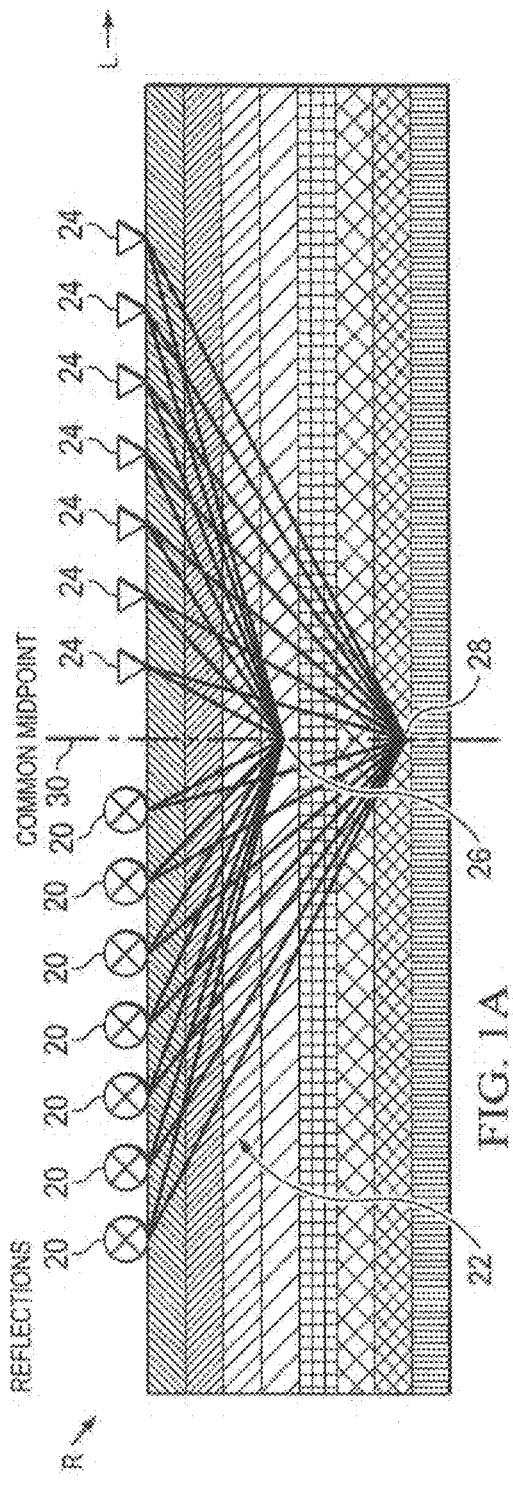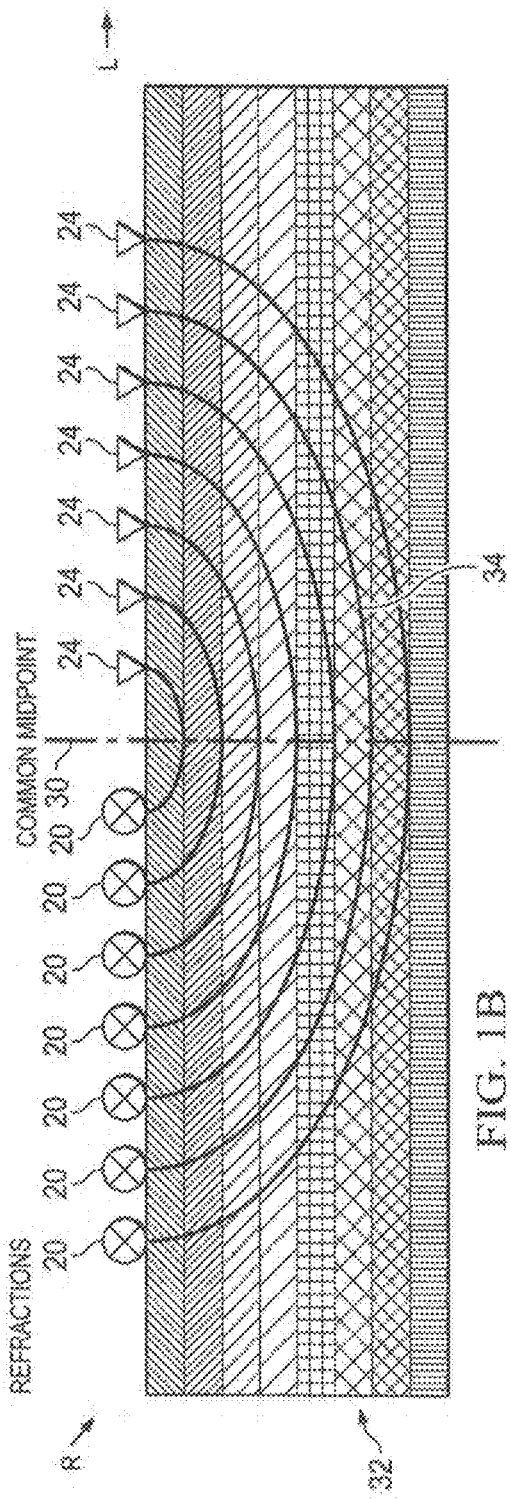

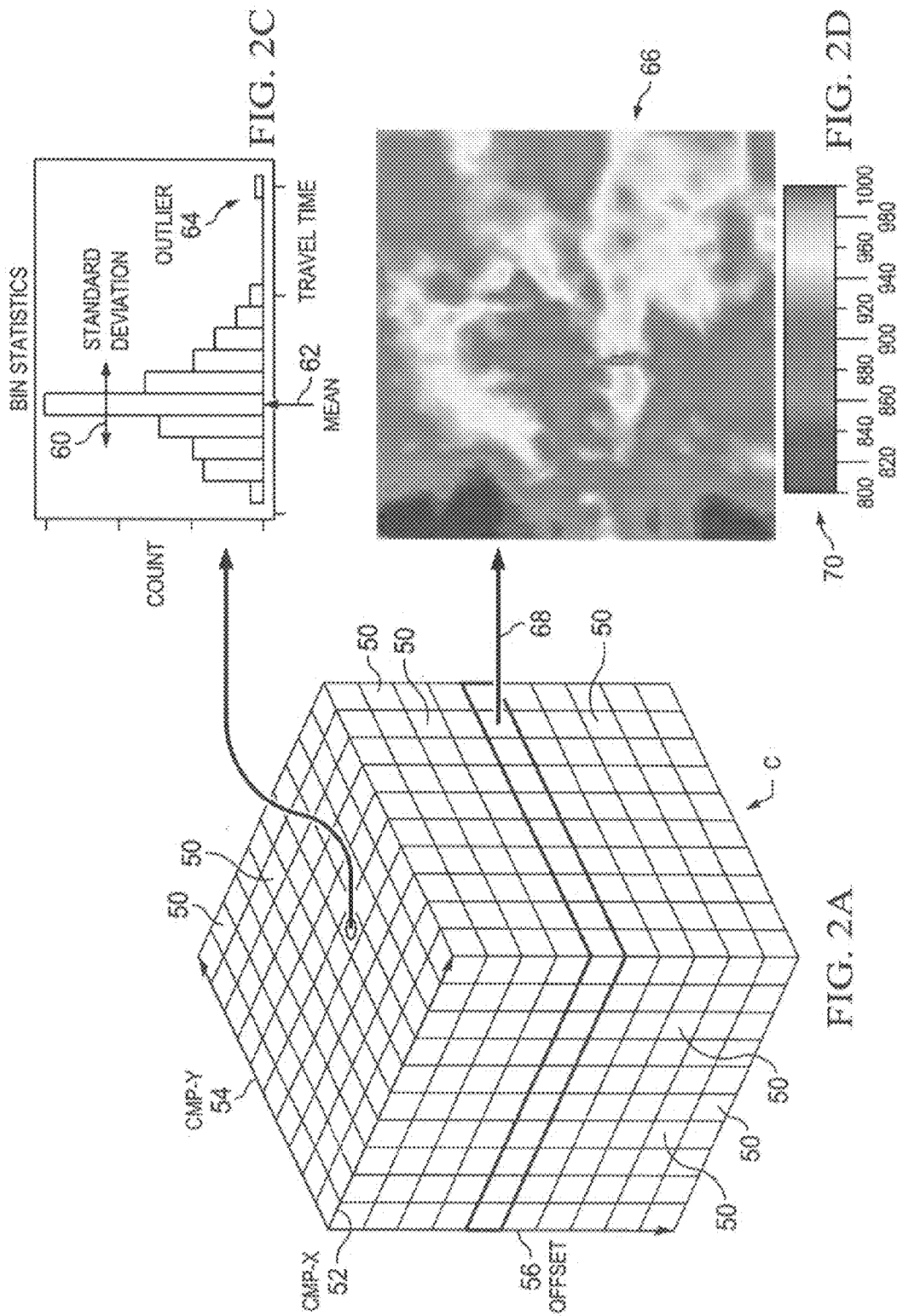

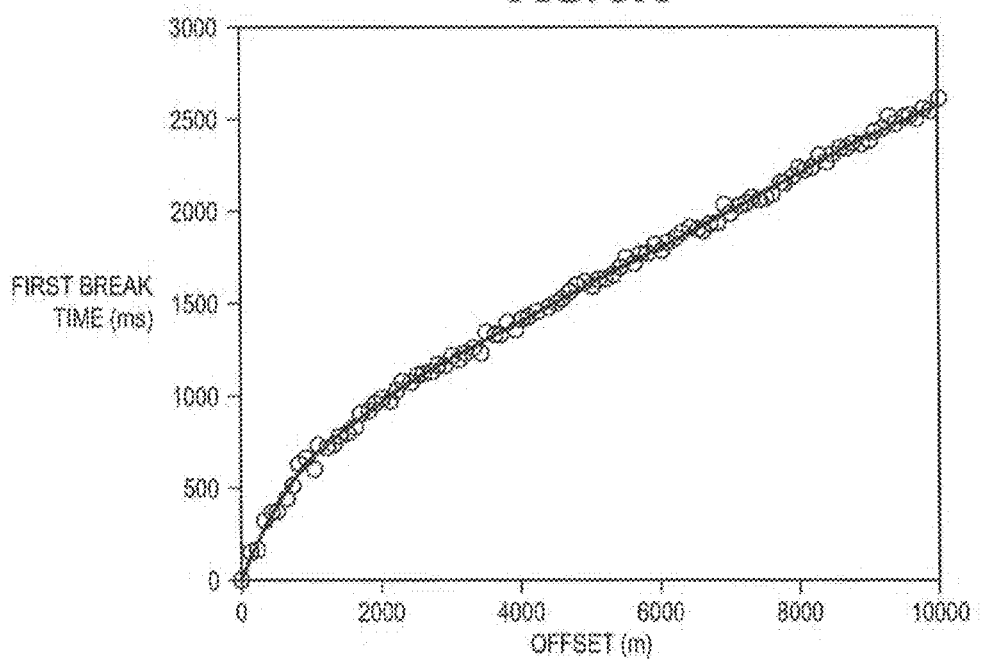
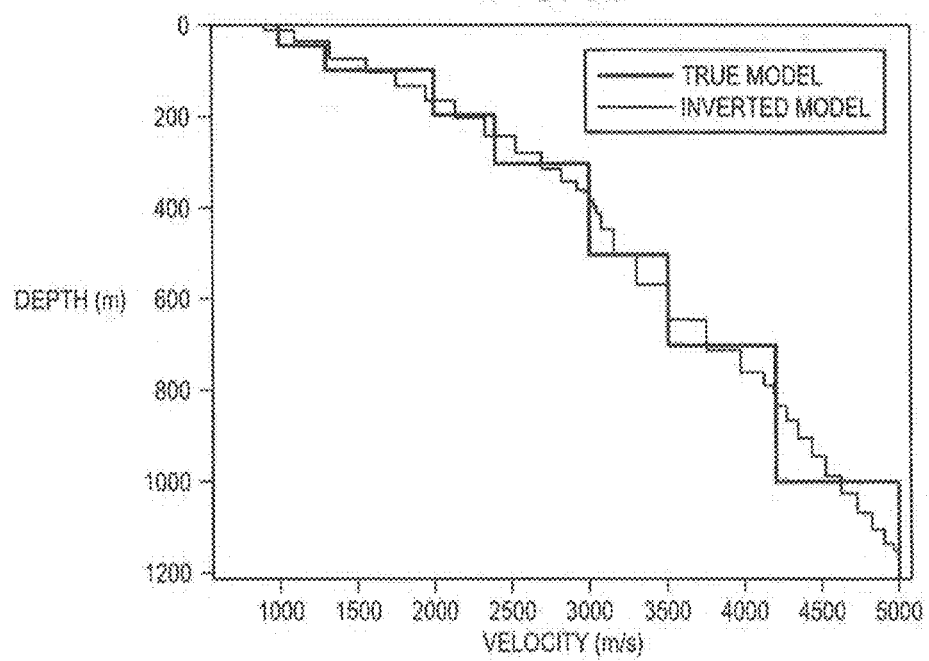

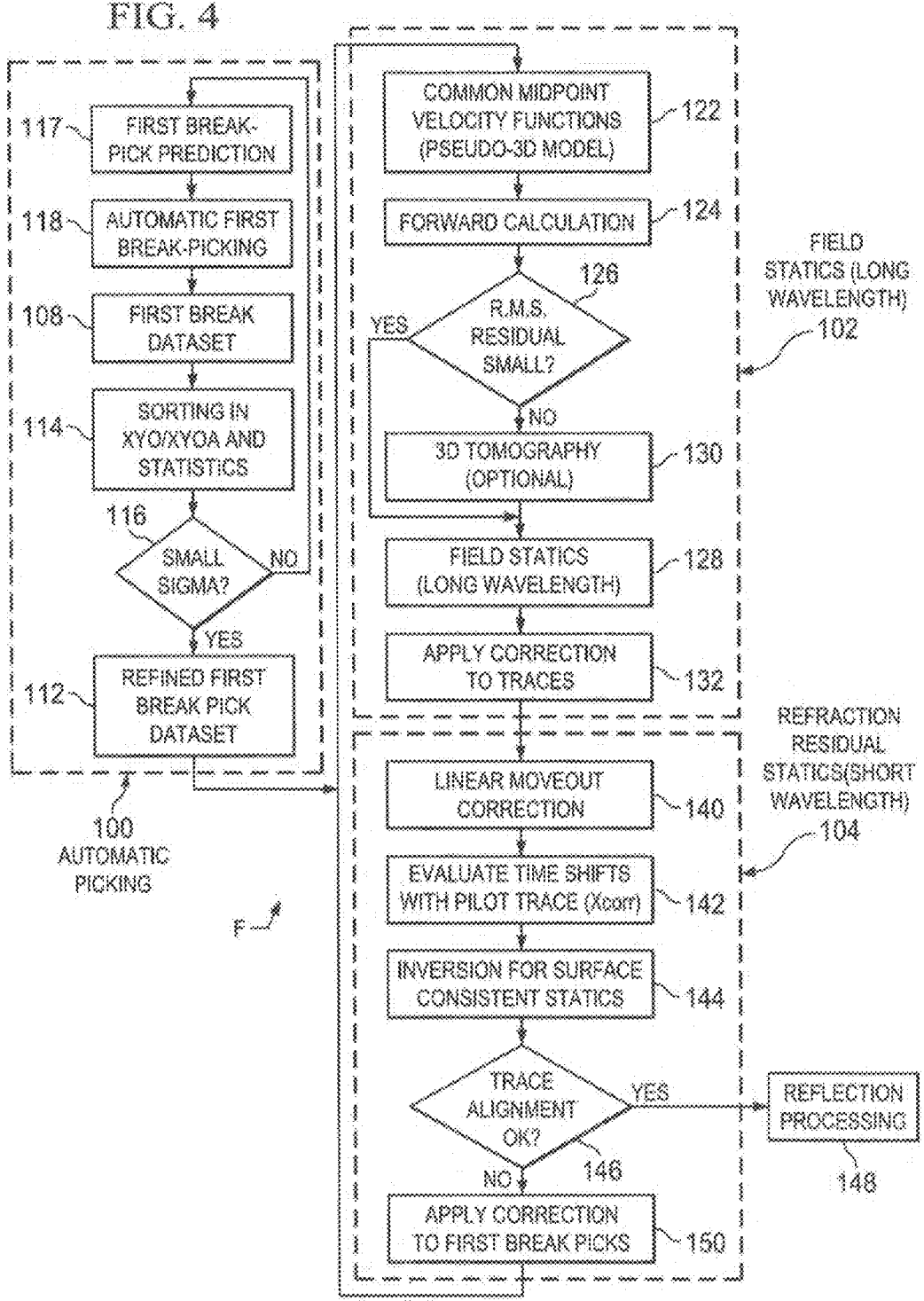

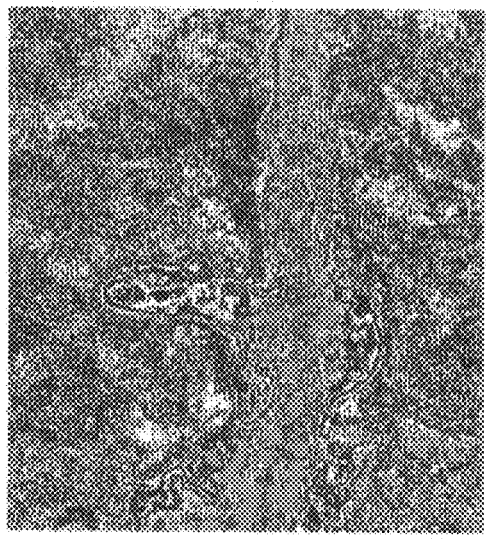
FIG. 8A
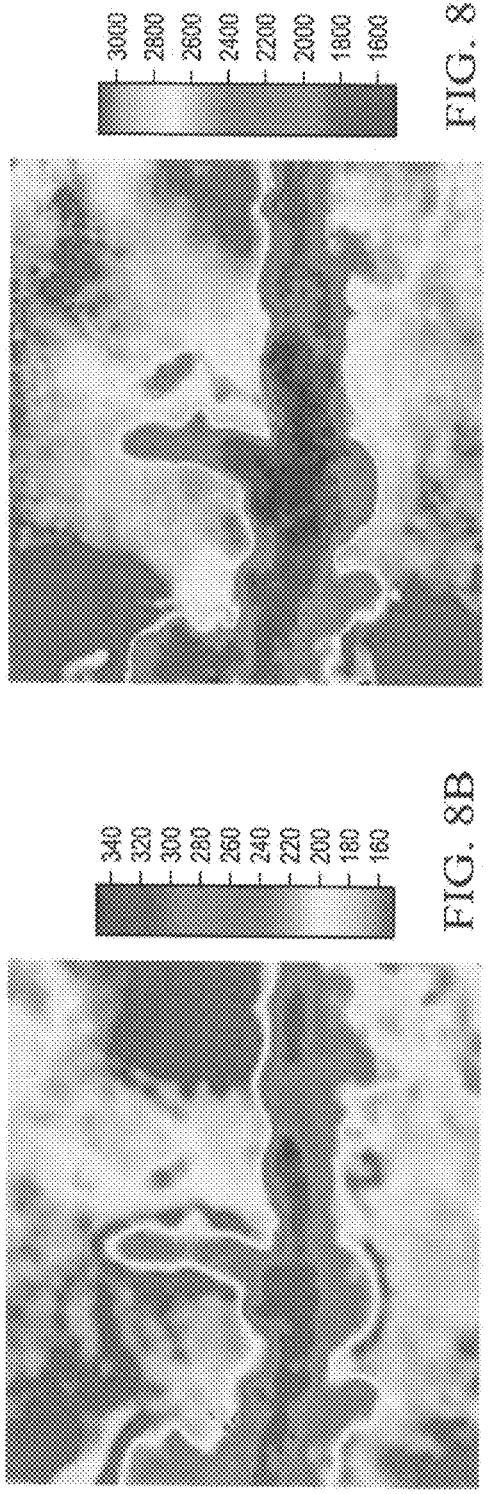
FIG. 8C
FIG. 8B

AUTOMATED NEAR SURFACE ANALYSIS BY SURFACE-CONSISTENT REFRACTION METHODS

This application claims the benefit of U.S. Provisional Patent Application No. 62/269,312 filed Dec. 18, 2015 entitled "AUTOMATED NEAR SURFACE ANALYSIS BY SURFACE-CONSISTENT REFRACTION METHODS."

BACKGROUND OF THE INVENTION

1. Field of the Invention

The present invention relates to geophysical exploration, and more particularly to seismic surveying and processing of seismic data and surface-consistent refraction analysis for deriving near surface corrections of the seismic data.

2. Description of the Related Art

The seismic industry has been trending towards dramatic increases in the number of the seismic acquisition channels. The increased availability of data which are acquired in seismic surveys with increased acquisition channels has made available the recording of full azimuth data at an unprecedented spatial resolution.

Conventional seismic data processing and analysis methods that were developed some several years ago are being found unsuitable to handle the large amount of data provided by modern seismic acquisition systems. One area of seismic processing chain that is showing difficulties to cope with the increased size of the seismic datasets is near surface analysis. For example, analysis of the near surface in search of subtle anomalies has been a problem. These subtle anomalies can have significant impact in the imaging of low relief structures and of stratigraphic traps.

So far as is known, pressing methodology for the purpose of analysis of the near surface is still based on interactive procedures where the input of the analyst is required. An example of processing requiring input by an analyst before analysis of the near surface is the estimation of refraction arrivals through semi-automated first break (FB) picking which requires time-consuming human intervention to quality control the data.

High resolution velocity analysis for the near surface could be provided by full-waveform inversion (FWI) methods. However, full wave inversion of the increased size seismic datasets requires large amounts of computational power, in fact often unmanageable amounts when considering the case of three dimensional (3D) elastic wave analysis. Moreover, full wave inversion processing of the increased size seismic datasets has exhibited sensitivity to noise and free surface effects such as surface waves. Full wave inversion processing of this type also requires seismic waves at low frequencies to avoid the effects of what are known as cycle skips. In addition, full wave inversion processing has required good velocity models as a starting point in order to limit the non-linearity of the problem.

Seismic tomography methods, commonly used in seismic data processing, whether for near surface or other purposes, also show difficulties in adapting to the volumes of data and need to compromise between the density of information and a viable parameterization of the models. Non-linear inversion methods are computationally demanding in that a single computer processing run of the massive amounts of data requires several inner iterations, and also several computer processing runs are required for exploring the parameter space and the initial model space.

There have been increasing numbers of seismic data channels becoming available from sampling with large redundancy every few meters of the subsurface, resulting in several billions of traces. However, seismic processing methods currently in use to analyze the near surface are not able to take full advantage of the redundancy of the information provided. So far as is known, effective processing of the amount of information, to provide high resolution velocity models for sharp and accurate near surface corrections, has not been available.

One alternative approach of near surface correction, used with the conditions of dense subsurface sampling and large redundancy, is based on adoption of broad-sense statistical methods. Under certain acceptable simplifying assumptions based on the physics of the problem, these have offered robust, quick and effective solutions to seismic imaging. One example of this sort is the well-known collection of surface-consistent algorithms for processing seismic reflection data. In this context, the term surface-consistent are defined to mean that a given location on the earth surface is associated with a fixed time delay without regard to the total wave path. This type of processing has been effectively used in everyday processing work. Calculation of surface-consistent reflection residual statics is a fundamental step in land seismic data processing. Surface-consistent residual statics techniques of this type solve the short wavelength/high frequency component of near surface correction to improve the coherency of reflected events, and enhancing the imaging of the subsurface geology. Reflection statics are based on cross-correlation of high frequency seismic signals. For this reason, preventive application of long wavelength refraction statics is required align the traces and avoid cycle skipping. In a conventional seismic processing workflow the long wavelength component of the static solution is obtained through the laborious analysis and inversion of refracted data.

The adoption of surface-consistent approaches for the analysis of first break of first break data has been proposed as a methodology for taking advantage of the redundancy provided by high-channel count seismic acquisition systems. Statistical analysis in a surface-consistent fashion of large volumes of data was envisioned as a potential solution to robust quality control of first break travel times and for reduction of overall turnaround time for near surface analysis.

It has also been proposed to incorporate first break data in an existing surface-consistent deconvolution procedure. The surface-consistent deconvolution processing could permit derivation of attribute maps, such as scaled velocities, under certain conditions. The conditions were that these attribute maps had to correlate well with the expected geology, and exhibit sealed travel times which matched the general behavior of the input data.

SUMMARY OF THE INVENTION

Briefly, the present invention provides a new and improved computer implemented method of forming measures of near surface corrections of seismic survey data in the form of a set of seismic survey traces obtained from records of seismic energy travel from seismic sources to an array of seismic detector geophones during a seismic survey. A seismic trace first break dataset detected by the array of detector geophones during the survey as a result of first arrival times at the detector geophones of seismic energy from the sources is assembling in the computer. The arrival times of the first break dataset are sorted into offset bins of a travel time attribute cube according to common midpoints for retracted seismic wave travel between the seismic sources and individual ones of the detector geophones of the array. The common midpoints being organized into dimensional offsets of the detector geophones of the array. Anomalous arrival times are removed from the sorted arrival times in the offset bias to form refined first break datasets. Common midpoint velocity functions are formed for the traces of the offset bins based on the first break datasets, and measures of field static corrections are formed for traces of the offset bins based on the common midpoint velocity functions. The measures of field statics corrections are applied to the traces of the sets of seismic survey traces to form a set of field statics corrected seismic traces, and measures of refraction residual statics corrections are formed for the traces of set of field statics corrected seismic traces. The measures of refraction residual statics corrections are applied to the traces of set of field statics corrected seismic traces to form near surface corrected seismic traces.

The present invention also provides a new and improved data processing system forming measures of near surface corrections of seismic survey data in the form of a set of seismic survey traces obtained from records of seismic energy travel from seismic sources to an array of seismic detector geophones during a seismic survey. The data processing system includes a processor which performs an ordered sequence of steps which begin with assembling in the computer a seismic trace first break dataset detected by the array of detector geophones during the survey as a result of first arrival times at the detector geophones of seismic energy from the sources. The processor then sorts the arrival times of the first break dataset into offset bins of a travel time attribute cube according to common midpoints for refracted seismic wave travel between the seismic sources and individual ones of the detector geophones of the array, the common midpoints being organized into dimensional offsets of the detector geophones of the array. The processor removes anomalous arrival times from the sorted arrival times in the offset bins to form refined first break datasets, and forms common midpoint velocity functions for the traces of the offset bins based on the first break datasets. The processor then forms measures of field static corrections for traces of the offset bins based on the common midpoint velocity functions, and applies the measures of field statics corrections to the traces of the set of seismic survey traces to form a set of field statics corrected seismic traces. The processor then forms measures of refraction residual statics corrections for the traces of set of field statics corrected seismic traces and applies the measures of refraction residual statics corrections to the traces of set of field statics corrected seismic traces to form near surface corrected seismic traces. The data processing system also includes a memory receiving for storage the near surface corrected seismic traces.

The present invention also provides a new and improved data storage device having stored in a non-transitory computer readable medium computer operable instructions for causing a data processing system to form forming measures of near surface corrections of seismic survey data in the form of a set of seismic survey traces obtained from records of seismic energy travel from seismic sources to an array of seismic detector geophones during a seismic survey. The instructions stored in the data storage device cause the data processing system to assemble in the computer a seismic trace first break dataset detected by the array of detector geophones during the survey as a result of first arrival times at the detector geophones of seismic energy from the sources. The stored instructions cause sorting of the arrival times of the first break dataset into offset bins of a travel time attribute cube according to common midpoints for refracted seismic wave travel between the seismic sources and individual ones of the detector geophones of the array, the common midpoints being organized into dimensional offsets of the detector geophones of the array. The instructions in the data storage device then came removal of anomalous arrival times from the sorted arrival times in the offset bins to form refined first break datasets. The instructions also cause forming of common midpoint velocity functions for the traces of the offset bins based on the first break datasets, and forming measures of field static corrections for traces of the offset bins based on the common midpoint velocity functions. The instructions cause the processor to then apply the measures of field statics corrections to the traces of the set of seismic survey traces to form a set of field statics corrected seismic traces, and form measures of refraction residual statics corrections for the traces of set of field statics corrected seismic traces. The instructions then cause the data processing system to apply the measures of refraction residual statics corrections to the traces of set of field statics corrected seismic traces to form near surface corrected seismic traces.

BRIEF DESCRIPTION OF THE DRAWINGS

FIG. 1A is a schematic diagram illustrating travel of reflected wave seismic energy through a near surface region of the earth during a seismic survey.

FIG. 1B is a schematic diagram illustrating travel of refracted wave seismic energy through a near surface region of the earth during a seismic survey.

FIG. 2A is a schematic diagram of a hypercube of a seismic travel time attribute according to the present invention.

FIG. 2C is a schematic diagram of statistics obtained for the seismic travel time attribute for a data bin of the hypercube of FIG. 2A.

FIG. 2D is an example plot of a travel time common offset map and attendant color key formed according to the present invention.

FIG. 3A is a plot of a cubic spline fit of travel time/offset distribution for model travel time data.

FIG. 3B is a plot of true and recovered velocity models of a layered velocity model.

FIG. 4 is a functional block diagram of a flow chart of data processing steps for automatic near surface analysis by surface-consistent refraction according to the present invention.

FIGS. 8A, 8B, and 8C are plots of example data during processing according to the present invention to provide common midpoint (CMP) velocity models according to the present invention.

DETAILED DESCRIPTION OF THE PREFERRED EMBODIMENTS

Figure 2B:
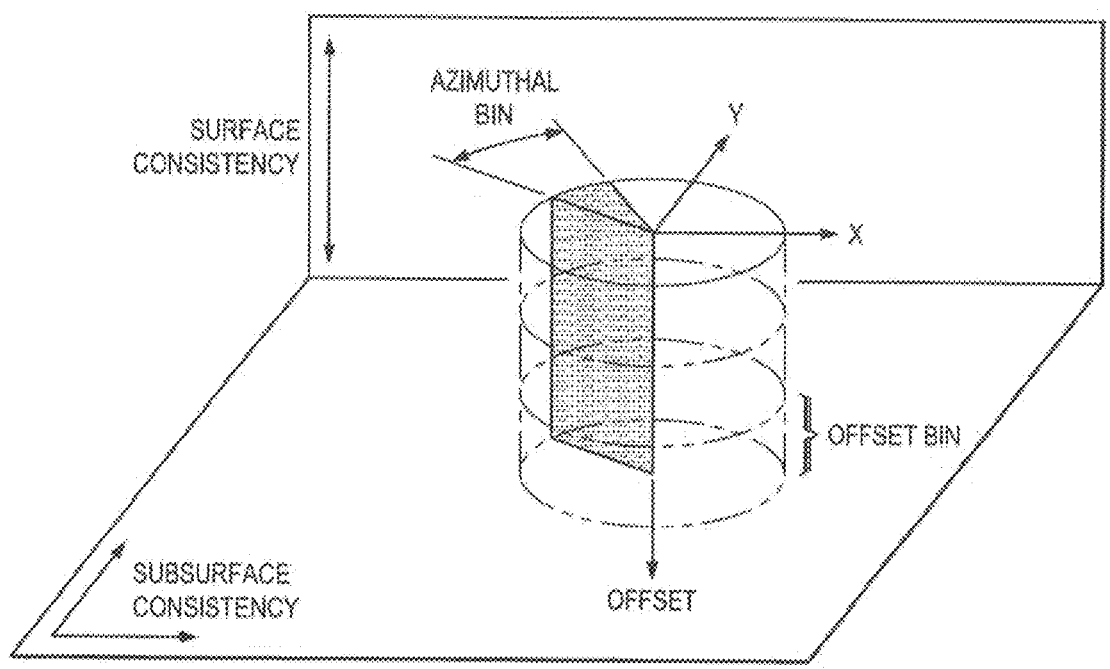
FIG. 2B is a schematic diagram of a bin form the hypercube of FIG. 2A divided into azimuthal sectors.

In the drawings, FIG. 1A illustrates schematically a plot of seismic wave travel resulting from the performance of a two-dimensional reflection seismic survey along a seismic line of profile along a longitudinal direction or line of profile L over a region R of the earth. The present invention is equally applicable to three-dimensional surveys or to two intersecting rectangular lines of profile, as well.

As indicated schematically in FIG. 1A, seismic energy is imparted at a number of elastic wave sources or shot points 20 along the line of profile L for travel along travel paths 22 through a succession of subsurface formation layers for receipt at a number of detector geophones 24 along the line of profile. The detector geophones 24 serve as sensors or receivers of the seismic energy imparted by the sources 20.

Seismic energy from the sources travels as waves as indicated at 22 downwardly from the sources 20 through a number of subsurface layers at increasing depths in the earth. At each successive interface between adjacent layers, because of the differing acoustic velocity (i.e. seismic impedance) a portion of the seismic energy is reflected as shown schematically at interfaces 26 and 28 as reflected waves and travels to the sensor geophones 24. The reflected energy sensed is then recorded and stored for seismic data processing to locate and identify subsurface of interest for the purpose of exploration and production of hydrocarbons. In such data processing, the energy sensed at particular groupings of sensors 24 are assembled as functions of a common time scale into what are known as seismic data gathers.

FIG. 1A illustrates schematically what is known as a common midpoint gather or CMP gather. In the CMP gather of FIG. 1A, seismic data traces from a reflection seismic survey resulting from reflected wave energy imparted at each of a set of individual shot points 20 and received at associated sensors 24 are assembled for subsequent processing in accordance with the present invention. The individual shot points 20 and their associated receivers 24 in the CMP gather are equally spaced from each other on the earth surface from a common midpoint 30, equidistant between each source and receiver set or pair.

FIG. 1B illustrates schematically a plot of seismic wave travel resulting from the performance of a two-dimensional refraction seismic survey along a seismic line of profile along the longitudinal direction or line of profile L over the surface region R. As indicated schematically in FIG. 1B, seismic energy is imparted at the shot points 20 along the line of profile L for travel through the earth for receipt at the sensor or detector geophones 24 along the line of profile. The present invention is equally applicable to three-dimensional surveys or to two intersecting rectangular lines of profile, as well. The plots of FIGS. 1A and 1B typically formed as a result of a single survey, with portions of the seismic energy from the shot points 20 travelling through the earth as reflected energy waves as shown in FIG. 1A and other portions of the seismic energy traveling as refracted energy waves as shown in FIG. 1B.

At each of succession of increasingly deeper interfaces between subsurface formation layers, each identified by reference numeral 32, portions of the seismic energy from the sources 20 rather than being reflected as shown in FIG. 1A is refracted as shown in FIG. 1B at each of the interfaces 32. The refracted energy at an example one of the interfaces 32 travels along such interface as a refracted wave indicated at 34 for some distance as shown in FIG. 1B until the refracted wave energy travels upwardly to the detector geophones 24. Refracted waves travel along other interfaces between other layers as indicated in FIG. 1B. In the idealized model depicted in FIG. 1B (velocity increasing with depth), the offset is the main parameter controlling the depth of penetration of refracted waves 34.

Thus, as shown in FIGS. 1A and 1B, in seismic surveying when the earth is excited with energy from the elastic wave sources 20, the wave propagation are approximated and described by rays. Reflected waves such as at 22 and refracted waves such as at 34 are scattered at velocity interfaces such as 26, 28 and 32. The present invention utilizes this physical manifestation of seismic energy travel indicated schematically in FIGS. 1A and 1B for a methodology of automated near surface analysis by surface-consistent refraction, as will be described below. The present invention involves the seismic data processing sequence and is performed to provide an iterative methodology implemented in computers both for refinement of automated near surface analysis by surface-consistent refraction. The present invention is to a great extent automated and is based on robust statistics.

The common midpoint (CMP) sorting domain is assumed to represent the common subsurface structure. This assumption developed for reflected waves such as shown schematically in FIG. 1A is also applicable to a surface-consistent representation of refracted waves, such as that shown schematically in FIG. 1B. With refracted waves such as shown in FIG. 1B, differently from reflections, each source-receiver pair is spaced at different offset from each of the other source-receiver pairs, but shares the same common midpoint or CMP 30. The data obtained from processing refracted wave energy of the type shown schematically in FIG. 1B from each source-receiver pair provides information about a different part of the structure: a different depth and a different seismic velocity.

For refracted waves, with the present invention, it has been found that an effective and concise representation of the subsurface structure is obtained from the binning in the CMP and offset domains. The process of binning in the CMP and offset domains is schematically illustrated FIGS. 2A through 2D.

With the present invention, a large three dimensional first break dataset is organized in a single cubic volume C (FIG. 2A) composed of a number of voxels or bins of 50, where each voxel 50 stores a collection of first break picks occurring in a three dimensional space. In the embodiment of FIG. 2A, the cubic volume C is composed along intersection axes of offset spacing times based on a CMP-X spacing as indicated at 52, a CMP-Y offset spacing as indicated at 54, and an offset spacing as indicated at 56. Within each voxel 50 statistics are calculated on the first break data assigned to that voxel to determine multimodal distributions of travel times and derive robust travel time estimates (according to mean, median, mode, standard deviation, kurtosis, and other suitable statistical accuracy analytical measures) related to azimuthal sectors allocated to the bin or voxel 50.

The multidimensional binning thus results in a 3D dataset of first break travel times, where first break data are sorted in CMP-offset-azimuth (XYOA) bins 50. The XYOA bins 50 as indicated in FIG. 2B provide structural information in the offset plane (subsurface consistency) and input to surface-consistent information when evaluated across the offsets.

This methodology allows statistical representation in a single volume of a large three dimensional first break pick dataset into a single organizational module for processing and analysis. The present invention assembles data representing common physical features into a group for statistical analysis, rejection of anomalous or aberrant first break picks, which are known as outliers, and verification of the consistency of the results relative to the underlying geology. Statistics are performed in each bin to evaluate mean values and to reject outliers. A visual inspection of the first break pick dataset is made possible by dissecting the obtained volume with various planes and, as an additional step, analytical functions are derived to describe the distribution of the property in the volume and to possibly predict data where gaps are present.

As an additional dimension of binning, the XYO bin is preferably further divided in azimuthal sectors (XYOA bin) (FIG. 2B) to provide an additional parameter to the analysis and to implement azimuth-dependent statistics. The four-dimensional hypercube C so formed are analyzed, e.g. by slicing it through different offset/azimuth planes (displayed in FIG. 2D is an offset=2,000 m, with an azimuth of ±45° N). The resulting hypercube C enables the collection of large volumes of data and the efficient statistical analysis across multiple domains. First break travel times from large 3D surveys are quickly represented in the four-dimensional hypercube C and quality controlled for identification of outliers and/or for geometry errors. The methodology according to the present invention can also be extended to seismic traces as the refracted events can show a subhorizontal alignment in a XYO bin.

After binning all the traces and the first break picks, statistics are calculated in each bin (mean, median, mode, standard deviation, cross-correlation, etc.). These multidimensional attribute cubes have been found to be an useful quality control tool as they allow visualization of the spatial trends of the travel time (mean values) and the noisy areas (standard deviation). A rejection of outliers is readily implemented by discarding the first break picks that differ significantly (for example) from the mean value, using an adaptive scheme that takes into account the standard deviation to determine the rejection threshold. The mean value as a rejection of outliers can be readily implemented. One can also use statistical measures different from the mean, such as the median or other statistical measures for this purpose.

FIG. 2C illustrates schematically an example statistical representation of the distribution for a single voxel 50 of the cube C of FIG. 2A. This is performed by sorting the three dimensional first break pick dataset of the cube C into individual binned travel time attribute cubes represented by the individual voxels 50.

The standard deviation (σ) of the first break pick values for an example such voxel is indicated schematically in FIG. 2C at 60, while a mean value of first break picks is indicated schematically at 62. An anomalous or aberrant first break pick value or outlier is indicated schematically at 64 in FIG. 2C. Based on the other first break pick values of the voxel 50 in FIG. 2B, the outlier first break pick 64 is one not satisfying the statistical filtering, and thus statistically unreliable. If included in first break auto picking, an outlier value such as that at 64 is likely to distort the accuracy of further processing of the survey data.

When performing XYO binning, the bin size in the X and Y direction is kept large enough that enough actual CMP's fall into a bin in order to provide significant statistics. A visualization of this process is provided by FIG. 2A, where the binning domain becomes CMP-X, CMP-Y and offset (XYO domain) with offset representing the pseudo depth. This type of binning in XYO domain is different from conventional sorting in the common offset domain, as the latter collects data sharing a common offset but pertaining to different CMP's. Thus several common offset volumes are needed to visualize and provide quality control or QC of a dataset of 3D first break travel time. The usual CMP sorting (time-offset) such as applied for reflected waves has been found not very useful for refracted waves as it can show events with variable velocities over the offset axis. The XYO binning provided according to the present invention is therefore an effective representation of both time and offset domains where common properties at the CMP position are quickly assessed.

FIG. 2D is an example plot 66 of a mean travel time common offset map formed according to the present invention for a certain offset as indicated by an arrow 68 referencing the location of that offset in the data matrix of the cube C. The travel times mapped in FIG. 2C are statistically processed values, after removal of outliers, with a color key 70 indicating the variations of the first break parameter values in milliseconds (msec or ms).

The methodology according to the present invention is well suited for future increase of the number of channels used in seismic acquisitions as robust statistics on even smaller bins are performed. The XYO/XYOA sorting domain allows the efficient extraction of parameters useful for enhancing the seismic processing workflow.

The concise representation and statistical analysis of a large 3D first break travel-time dataset is already a very useful tool provided to seismic processors to enable the identification and removal of erroneous picks. This step allows cleaning the data before starting travel time tomography. The properties of the XYOA hypercube can also be utilized for velocity analysis in alternative to or as an initial step before invoking time-consuming inversion processes. These processes are defined as surface-consistent and subsurface-consistent analysis using concepts developed for reflection data processing.

Surface-Consistent and Subsurface-Consistent Analysis

Surface-consistent approaches are meant to decompose the recorded seismic data in terms representing the source and receiver functions and the propagation term. The time-domain convolutional model representation of a seismic trace $P_{ij}$ created by shot number i and recorded at receiver j are written as:

$$P_{ij}(t)=S_i(t)*R_j(t)*\Gamma_{ij}(t) \quad (1)$$

where S is the source function, R is the receiver impulse response, Γ is the Green's function and * indicates convolution in time domain.

In order to achieve this task, trace data are typically sorted in CMP domain, approximating the common reflection point, so that the collected data are assumed to represent the subsurface properties (subsurface consistency) to be estimated by velocity analysis and removed from the data by NMO correction before any attempt is made for the estimation of the source and receiver terms in (1) which contain the most variable components of the recorded data (surface consistency). The convolutional model can contain additional terms representing additional components (e.g. offset, azimuth) and the solution is sought in the log-frequency domain to reduce the equation to a linear form (Taner and Koehler, 1981). This process also separates the signal amplitude and phase in real and imaginary parts so that the two components are analyzed and processed separately. Standard surface-consistent static approaches deal with the phase shifts used to derive time shifts for the source and receiver components to correct residual misalignment of reflected events in the CMP gather.

Similarly to reflection data, the factors influencing differential arrival times of refracted events on a CMP-offset (XYO) gather are velocity and statics (source and receiver), where velocity is by far the main factor. Velocity has to be evaluated and corrected before attempting the estimation of surface-consistent residual statics so the workflow is divided in two steps that are performed automatically and in an iterative way. The steps include CMP velocity and residual statics estimates, but it is to be recalled that only refracted waves are involved in the analysis.

Subsurface-Consistent Analysis: CMP Velocities

The source-receiver terms of the convolutional model (1) are neglect in first instance and focus is made on the subsurface consistency at the CMP bin by performing first break statistics on XYO/XYOA gathers to identify and reject outliers and derive mean travel-time and standard deviation for each bin. Next, a 1D velocity function is determined for the robust time-offset distributions derived for each CMP. A constrained cubic spline fit is performed, imposing the following properties:
(a) Smoothness: the spline is an approximant;
(b) Monotonicity: travel time increases with offset;
(c) Negative curvature: velocity increases with depth; and
(d) Minimum and maximum slope: velocity is bounded.

A cubic spline approximant f(x) is determined that satisfies:

$$\min \sum_k w_k |t_k - f(x_k)|^2 + \lambda \sum_k f''(x_k)^2 \quad (2)$$

subject to:

$$\frac{1}{v_{max}} < f'(x_k) < \frac{1}{v_{min}},$$

$$f''(x_k) < 0,$$

$$k = 1, \ldots, N_K,$$

where k is an index spanning the offset bins in the XYO domain (the vertical axis of FIG. 2A), $x_k$ are the offset values at the bin center, $t_k$ are the mean travel times in the bin, $\lambda$ is a trade-off parameter between smoothness and data fit and $v_{min}$, $v_{max}$ are velocity bounds. Using finite difference approximations for the derivatives f' and f'', Equation (2) are expressed as a linear least squares problem with inequality constraints, which is solved with quadratic programming techniques (Gill et al., 1981). The data weights $w_k$ are derived from a combination of standard deviations obtained during the binning step and an offset-dependent function that privileges the fit for the short offset picks, in order to better capture near surface features.

An inversion procedure is used to generate travel times contaminated with Gaussian noise ($\sigma=20$ ms) as input data and a custom spline fit performed. FIG. 3A is a plot resulting from constrained cubic spline fitting performed in the manner described above for a single CMP bin 50 of the XYO hypercube C of FIG. 2A. The spline fit and the input data are identified as indicated in FIG. 3A. FIG. 3B is a plot, as functions of depth for short offset picks, of a time velocity model as identified in FIG. 3B in comparison with an inverted velocity model.

After having computed a cubic spline function for each CMP bin, its value and first derivative is evaluated on a set of discrete points to obtain travel times and apparent velocities, then a simple intercept/delay-time method (Telford et al., 1990) is used to derive a layered velocity model from this piecewise linear function.

$$z_k = \frac{v_k t_k}{2 \cos(\theta_k)} \quad (3)$$

Where:

$$\theta_k = \sin^{-1}\left(\frac{v_k}{v_N}\right), \text{ for } k = 1, \ldots, N_K$$

The constraints imposed on the spline guarantee that the method is applicable and yields physically meaningful thicknesses and velocities for the layers. As a result a 3D distribution of depth-velocity samples is obtained which is interpolated to a regular grid with geostatistical interpolation algorithms, such as Kriging. The resulting pseudo-3D velocity cubes are used directly for evaluating long wavelength statics corrections, or as an initial model for 3D tomography.

As will be described below, although there are approximations involved, the computed velocity field captures quite well the trends when compared to results from tomography. The process requires a fraction of the time needed to run a topographic inversion, it is fully automated and does not depend on the choice of an initial model. The workflow described above implements refraction subsurface-consistent velocity analysis (CMP velocity). It should be understood that the specificity of the solutions presented above, such as: quadratic programming, delay times, mean, standard deviation, etc. are examples of a particular realization of the invention and can be substituted by other methods. For example an inversion can be down with many different algorithms.

Surface-Consistent Analysis: Refraction Residual Statics

After the field statics (i.e. long wavelength refraction statics) have been corrected for, a cross-correlation of early arrival waveforms in the XYOA gather is used to determine relative time shifts to be inverted for surface-consistent refraction residual statics. A system of linear equations expressing the interaction of near surface layers and wave travel is solved simultaneously to determine source and receiver terms.

Figure 7A:
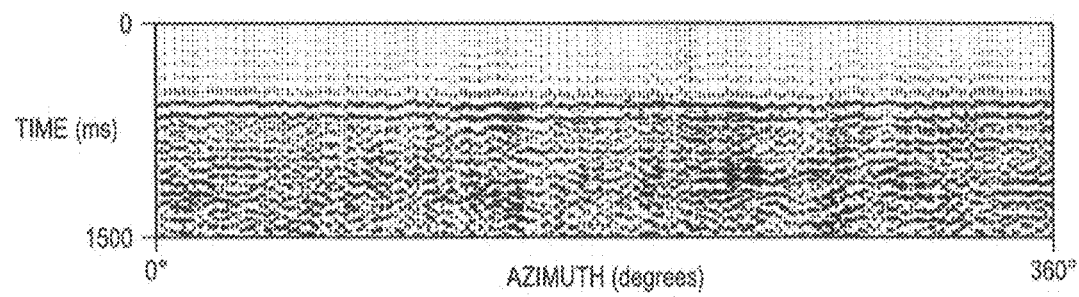
FIGS. 7A, 7B and 7C are plots of example seismic traces of first break picks during the data processing steps of FIG. 4.
Figure 7B:
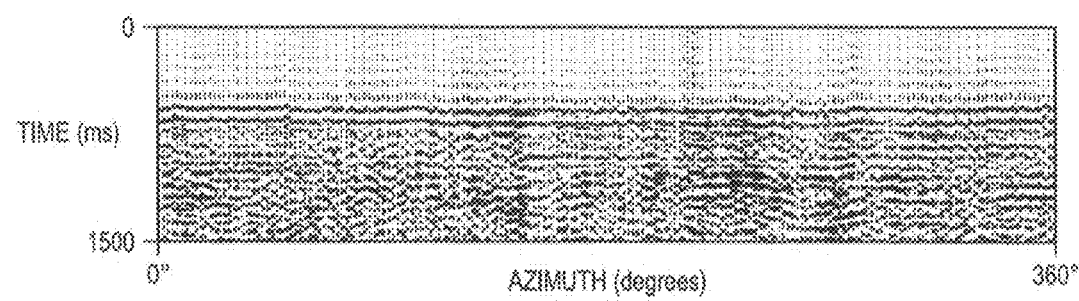

The traces within each XYO bin are collected and form a gather additionally sorted in azimuth (FIG. 7A). Traces are linear moveout—corrected or LMO—corrected (FIG. 7B)

using the apparent velocity derived in the manner described above from the smooth spline fit, evaluated at the central offset in the bin. If the lateral velocity variations are small, the gather should look approximately flat near the first arrived; this is the property that is exploited in order to recover residual statics. In this context the LMO step is similar to the NMO correction required in the reflection statics analysis, but it should be pointed out that the automatic spline fit does not require any velocity picking or analysis, which represents a time consuming step in the processing workflow. The "field" static is also applied at this stage to correct for the effects of the macro velocity model.

The first-break picks are used to derive a preliminary flattening and a robust stack is performed to obtain a pilot trace. A cross-correlation analysis is then carried out on all the traces on a narrow window centered on the first arrival, to obtain time shifts with respect to the pilot. It should be understood that other methodologies than cross-correlation may be used to measure similarity among the trace time series. For example, semblance (maximum stacking energy) can be used as a criteria rather than cross-correlation to form measures of the estimated time shifts. Having compensated most of the subsurface velocity effects, these shifts are assumed to be mainly due to surface-consistent source and receiver terms. After the cross-correlation analysis is carried out for all the XYO gathers, a large collection of time shifts $T_g$ results. Rewriting Equation (1) in terms of first arrival travel times obtains:

$$S_i + R_j + G_k = T_{ij} \quad (4)$$

where i the source index, j is the receiver index and k is the index of the XYO bin related to the trace ij. $G_k$ represents an unknown subsurface term that accounts for velocity variations and is solved for together with the source and receiver terms.

A linear system is set up of the form:

$$Ax = t \quad (5)$$

where t is the vector of estimated time shifts, x is the unknown vector formed by $S_i$, $R_j$ and $G_k$ and A is a matrix that is dependent on the survey geometry. The number of rows in A corresponds to the total number of traces used $N_T$, while the number of columns is the sum of the number of sources ($N_S$), receivers ($N_R$) and XYO bins ($N_{XYO}$) considered. This matrix is highly sparse as it contains 3 ones per row, indexing the source, receiver and XYO bin which contribute to each time shift.

$$x^T = [S_1 \ldots S_{N_S} \, R_1 \ldots R_{N_R} \, G_1 \ldots G_{N_{XYO}}]$$

$$t^T = [T_1 \ldots T_{N_T}]$$

$$A = \begin{bmatrix} 1 & * & \ldots & * & 1 & * & \ldots & * & 1 & * & \ldots & * \\ 1 & * & \ldots & * & * & 1 & \ldots & * & 1 & * & \ldots & * \\ \ldots & \ldots & \ldots & \ldots & \ldots & \ldots & \ldots & * & \ldots & \ldots & \ldots & * \\ * & * & \ldots & 1 & * & * & \ldots & 1 & * & * & \ldots & 1 \end{bmatrix}$$

In this example the first time shift is for i=1, j=2 and is located in the offset bin k=1; the second is for i=1, j=2 with k=1; the last row is for i=$N_S$, j=$N_R$ with k=$N_{XYO}$.

The solution is sought with damped weighted least squares:

$$\hat{x} = (A^T W A + \lambda D)^{-1} A^T W t \quad (6)$$

Figure 7C:
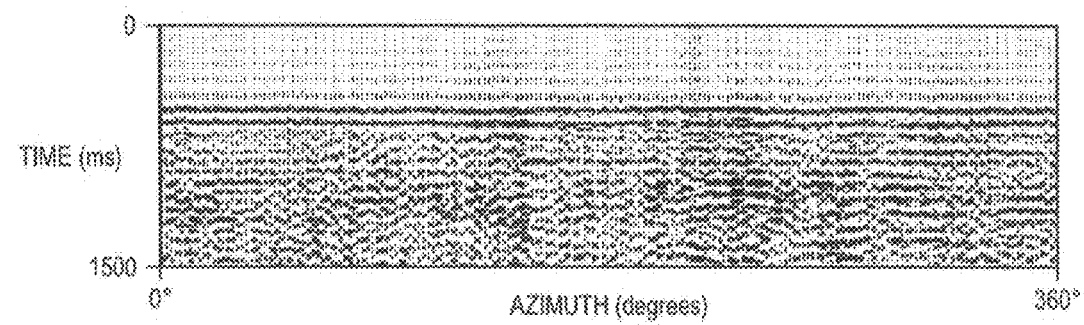

The diagonal matrix W contains the correlation coefficients of each trace with respect to the pilot trace, which is a good estimate of the reliability of that particular data point. The damping matrix D, also diagonal, ensures that the system is solved and prevents noise corrupting estimations of poorly resolved unknown parameters. The diagonal elements are scaled such that the variations of the $G_k$ terms are damped to a bigger extent than the source and receiver components. Even if the size can become very large (billions of rows, hundreds of thousands of columns), the system is extremely sparse and is efficiently solved with modern parallel sparse solvers. Having estimated source and receiver refraction residual statics, the correction is applied to the traces and the alignment of the first arrivals on sample XYO gathers assessed (FIG. 7C).

For large high-fold 3D surveys, the bin sizes are kept small so that the assumptions described above are verified well enough to give good results in practice. In the presence of azimuthal anisotropy or shallow 3D features, the assumption of flat first arrivals in a XYO bin may fail. However, it is expected to observe a smooth azimuth-dependent trend, which are subtracted prior to cross-correlation by fitting a least squares smoothing spline function to the travel times as a function of azimuth and imposing periodic end conditions to account for the circular nature of the angular domain. Alternatively, additional functional terms (equivalent to the residual normal movement (RNMO) term of Wiggins et al., "Residual Statics Analysis as a General Linear Inverse Problem: Geophysics 41, pp. 922-938 (1976) are added to the system of equations and solved imposing smoothness across the neighboring XYO bins.

Workflow

Figure 5:
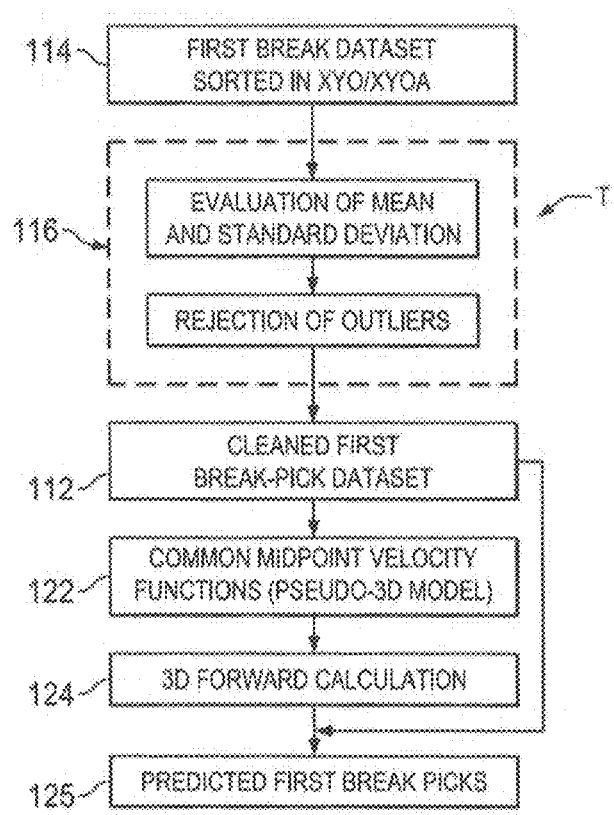
FIG. 5 is a functional block diagram of a flow chart of data processing steps for first break pick prediction during the automatic near surface analysis data processing steps of FIG. 4.

A comprehensive computer implemented methodology of modeling to perform automated near surface analysis by surface-consistent refraction according to the present invention is illustrated schematically in FIGS. 4 and 5. FIG. 4 illustrates a flow chart F setting forth schematically a preferred sequence of steps of a computer implemented process according to the methodology of the present invention for automatic near surface analysis by surface-consistent refraction. FIG. 5 illustrates a flow chart T setting forth the methodology of the present invention for first break pick prediction during the automatic near surface analysis data processing steps of FIG. 4.

The flow chart F and the flow chart T illustrate the structure of the logic of the present invention as embodied in computer program software. Those skilled in the art will appreciate that the flow charts illustrate the structures of computer program code elements including logic circuits on an integrated circuit that function according to this invention. Manifestly, the invention is practiced in its essential embodiment by a machine component that renders the program code elements in a form that instructs a digital processing apparatus (that is, a computer) to perform a sequence of data transformation or processing steps corresponding to those shown.

As are seen from the flow chart F, processing according to the present invention includes automatic picking processing as indicated generally at 100, field statics (for long wavelength near surface time corrections) processing as indicated generally at 102, and refraction residual statics (for short wavelength near surface time corrections) processing as indicated generally at 104.

Automatic picking processing 100 begins with an initial or starting first break dataset as indicated at step 108 being processed for near surface analysis in a sequence of computer implemented automatic picking processing steps to form an output refined first break pick dataset as indicated at step 112.

During the automatic picking processing sequence 100, as indicated in more detail in FIG. 5, the starting FB-pick dataset 108 is sorted during step 114 in XYO/XYOA gathers and processed as described above with respect to FIGS. 2A, 2B and 2C. The binning in the XYO/XYOA domain during step 114 is followed by statistical analysis and rejection of outliers during step 116. During the analysis by computer processing in step 116, the mean and standard deviation is evaluated for each bin 5, and outliers are rejected based on a defined standard deviation threshold as shown in FIG. 2C. This leads to a robust estimate of travel time vs. offset curves with corresponding standard deviation for use as the refined FB dataset 112. FIG. 7A is an output display of an example dataset provided as inputs for further statics processing. The robust time-offset curves are used to predict the behavior of noisy picks during step 117 and to guide an automatic re-picking during step 118 for adjusting or reforming of the first break dataset 108.

CMP-velocity functions are then generated during step 122 (FIGS. 4 and 5) for the cleaned FB-pick dataset formed during step 112. The CMP-velocity functions generating is performed with spline fitting or other method as described above with respect to FIGS. 3A and 3B. The generated CMP-velocity functions are also interpolated in 3D (a pseudo-3D velocity model). Then a 3D forward calculation is performed during step 124 (FIGS. 4 and 5) to obtain predicted first break data picks as indicated at 125 used as seed in step 117 for subsequent automatic first break picking during step 118.

As an alternative, the mean value for each XYO bin of the cleaned FB-pick data are used directly as a FB-pick prediction values 125 as shown in FIG. 5. It has been found that the use of statistics to predict the behavior of FB-pick is valid when the errors follow a Gaussian distribution that may not represent the actual behavior of the FB-pick especially at the initial steps of the iterative procedure. Often the estimates from the automatic picker are biased by late energetic arrivals which introduce systematic errors in the prediction. In such cases the use of an external method relating to the physics of propagation of seismic waves (3D forward calculation) during step 124 tends to provide the correct FB-pick estimates to be used in the successive automatic picking iteration.

Field Statics Processing

In the initial steps of field statics processing 102 (FIG. 4), once stable first break data are obtained, corresponding one-dimensional 1D velocity-depth functions are calculated during step 122 for each CMP, as described. A 3D forward travel time calculation is performed in step 124. A determination is made during step 126 based on the obtained travel time model from step 124 to evaluate the overall r.m.s. residual of the refined first break pick dataset. Step 126 is performed to determine whether the r.m.s. residual is within acceptable specified minimum levels. If so, processing proceeds to step 128 for calculation of the statics (field statics). If not, during step 130 an additional 3D tomography step can be performed to further refine the velocity model.

It should be noted that the workflow of the portion of refraction residual statics by field statics processing 102 fields is to identify and to adjust during step 132 the long wavelength component of the statics correction. Therefore, by field statics processing 102, the field statics correction is also adequate to satisfactorily align phases in the XYO gather and thus to avoid cycle skipping in the cross-correlation analysis.

Refraction Residual Statics Processing

During the refraction residual statics processing 104 (FIG. 4), surface-consistant analysis includes refraction residual statics estimation. In the refraction residual statics estimation, traces in the XYO gather are first corrected during step 140 for residual linear moveout (LMO) and then cross-correlated during step 142 to a pilot trace for the estimation of relative time shifts. The analysis and processing is performed for each CMP bin 50 over a range of offset classes to provide a large database of time shifts. The time shifts obtained are simultaneously inverted during step 144 for the source and receiver surface-consistent statics.

The improved alignment of traces is verified during step 146 for adequacy on the XYO gather (FIG. 7C) and successively on the seismic stack where the reflected events can increase stacking power and lateral continuity. FIG. 7A is a plot of traces sorted in XYO gathers with field statics corrections applied for surface-consistent evaluation of statics for an offset of 1250 m. FIG. 7B is a plot of the same data trace gather as FIG. 7A after residual LMO correction is applied and time shifts are estimated by cross-correlation with a pilot trace. FIG. 7C is a plot of the same data after surface-consistent refraction residual statics are applied to the traces in the gather.

If the alignment procedure is indicated successful as a result of step 146, the trace dataset with combined statics applied is then passed to the usual reflection processing as indicated at 148 in FIG. 4, where improved velocity analysis are performed and additional high frequency reflection statics are calculated. If alignment is indicated unsuccessful as a result of step 146, field static processing 102 may be repeated with refraction residual time delays corrections applied during step 150 to the first break pick dataset from step 112 to enable the repetition of the CMP-based velocity analysis processing step 122.

In the data examples discussed, good phase stability in the XYO gathers can be observed of the arrivals near the first break so that no wavelet shaping was made necessary before the step of cross-correlation (see FIG. 7A). In case variable wavelet phase rotations are observed, a preventive wavelet shaping process may be performed before cross-correlation.

Data Processing System

Figure 6:
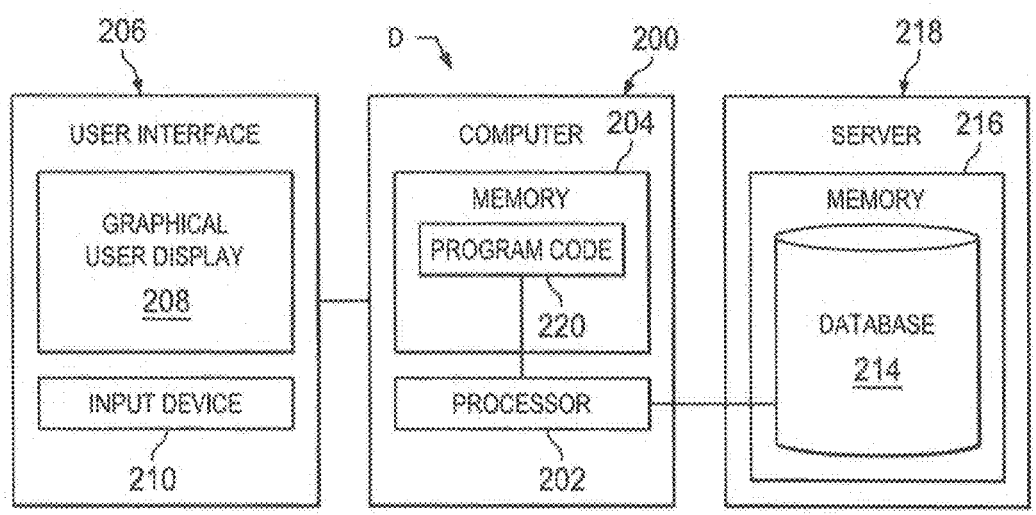
FIG. 6 is a schematic diagram of a data processing system according to the present invention for processing seismic data according to the processes of FIGS. 4 and 5.

As illustrated in FIG. 6, the data processing system D includes a computer 200 having a processor 202 and memory 204 coupled to the processor 202 to store operating instructions, control information and database records therein. The data processing system D may be a multicore processor with nodes such as those from Intel Corporation or Advanced Micro Devices (AMD), an HPC Linux cluster computer or a mainframe computer of any conventional type of suitable processing capacity such as those available from International Business Machines (IBM) of Armonk, N.Y., or other source. The data processing system D may also be a computer of any conventional type of suitable processing capacity, such as a personal computer, laptop computer, or any other suitable processing apparatus. It should thus be understood that a number of commercially available data processing systems and types of computers may be used for this purpose.

The processor 202 may be in the form of a personal computer having a user interface 206 and an output display 208 for displaying output data or records of processing of seismic survey data according to the present invention. The output display 208 includes components such as a printer and an output display screen capable of providing printed output information or visible displays in the form of graphs, data sheets, graphical images, data plots and the like as output records or images.

The user interface 206 of computer 200 also includes a suitable user input device or input/output control unit 210 to provide a user access to control or access information and database records and operate the computer 200.

Data processing system D further includes a database 214 stored in memory, which may be internal memory 204, or an external, networked, or non-networked memory as indicated at 216 in an associated database server 218. The database 214 also contains various seismic data including the in the form of seismic traces, source and geophone position coordinates, survey times and parameters and other data.

The data processing system D includes program code 220 stored in a data storage device, such as memory 204 of the computer 200. The program code 220, according to the present invention is in the form of computer operable instructions causing the data processor 202 to perform the methodology of improving the selection of first break picks for seismic data in seismic data processing and improving quality control of the first break picks.

It should be noted that program code 220 may be in the form of microcode, programs, routines, or symbolic computer operable languages that provide a specific set of ordered operations that control the functioning of the data processing system D and direct its operation. The instructions of program code 220 may be stored in non-transitory memory 204 of the computer 200, or on computer diskette, magnetic tape, conventional hard disk drive, electronic read-only memory, optical storage device, or other appropriate data storage device having a computer usable medium stored thereon. Program code 220 may also be contained on a data storage device such as server 208 as a non-transitory computer readable medium, as shown.

The processor 202 of the computer 200 accesses the seismic survey data pressure transient testing data and other input data measurements as described above to perform the logic of the present invention, which may be executed by the processor 202 as a series of computer-executable instructions. The stored computer operable instructions cause the data processor computer 200 to determine first break pick times for the seismic survey data traces in the manner described above and shown in FIGS. 3 and 10. Results of such processing are then available on output display 208.

Application of Processing to Land Data

An example dataset selected for processing according to the present invention is a 3D land case in central Saudi Arabia centered on a prominent geomorphological feature in the form of a bed or valley known as Wadi Sahba. The area is considered to be one of the most difficult seismic exploration problems in the whole of Saudi Arabia. The extremely low quality of the seismic data in the wadi section prevents the reliable interpretation of the boundaries of important oil and gas fields that are terminated by the wadi structure. The structural interpretation of the wadi (Weijermars, R., "Plio-Quarterly Movement of the East Arabian Block" Geo Arabia, 3, 509-539, 1998) has postulated the existence of a major transcurrent fault system, possibly still active, which generated the wadi Sahba depression and other similar structures to the west. Transpressional and transtensional stress regimes along the faults generate complex patterns of flower faults reaching the surface. The combination of scattering due to faulting and of sharp velocity variations in the near surface generates formidable problem conditions for seismic imaging. Complementary high-resolution geophysical methods such as described in (Colombo et al., "Super Resolution Multi-Geophysics Imagine of a Complex Wadi for Near Surface Corrections", 85$^{th}$ Annual International Meeting, SEG, Expanded Abstracts, 2015) have been described.

The processing according to the present invention as illustrated by the workflow of FIG. 4 according to the present invention was applied to a portion of the Wadi Sahba seismic dataset, and the obtained results were compared to a conventional analysis based on 3D travel time tomography. One of the goals of seismic imaging by processing according to the present invention is a better definition of the edges of the wadi structure and related faults, which determine the extent of the reservoir's continuation into the wadi area.

Near Surface Velocity Examples

An already refined first break pick dataset from step 120 during the computer processing workflow shown in FIGS. 4 and 5 is a starting point for near surface velocity processing. FIG. 8A is a reference time slice at 164 ms showing the structures characterizing the wadi area. CMP-based travel time-offset functions (FIG. 8B) are calculated during step 122. FIG. 8B is a mean travel time map of such CMP-based travel time-offset functions at 500 m offset. An associated numerical key is provided with FIG. 8B indicating the travel time values displayed. The CMP-based travel time-offset functions are transformed during step 122 to velocity-depth functions and interpolated to obtain a pseudo-3D velocity model, FIG. 8C is a plot of a pseudo-3D velocity model in the form of a velocity map 340 m a.s.l., or above sea level from depth conversion of travel time-offset distributions in each CMP location.

Field Statics Examples

Benefits according to the present invention for derivation of near surface corrections are now discussed in the context of comparative examples. It should be recognized that in addition to near surface corrections, potential benefits are provided from using the pseudo-3D velocity model according to the present invention as a starting point for 3D tomography. In order to provide fair comparisons with certain industry standard processing methods, the comparisons discussed are of a near surface solution according to the present invention with an independent solution obtained using a commercial tomographic package widely used in the industry, which has also been used for benchmark purposes.

Figure 9A:
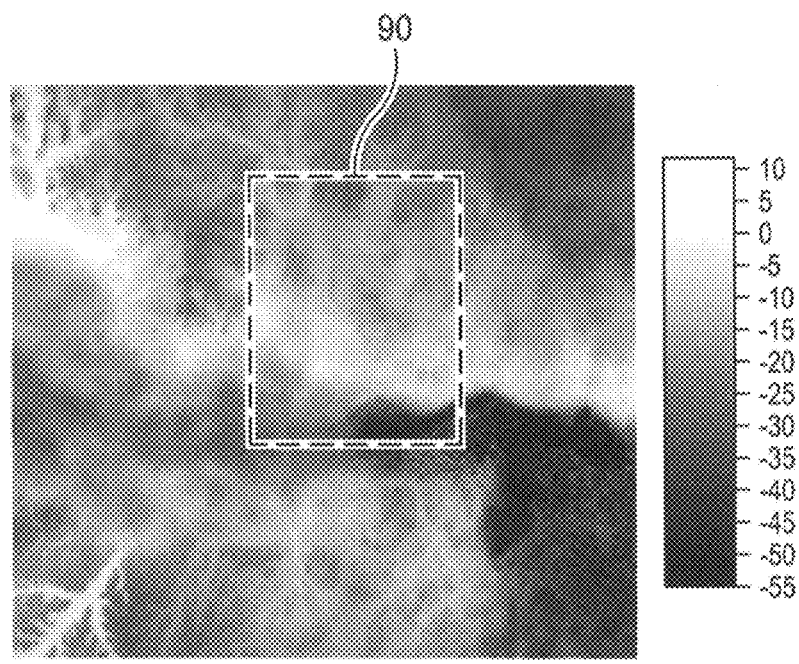
FIGS. 9A and 9B are plots of field statics according to tomographic velocity field processing compared against results obtained according to the present invention.
Figure 9B:
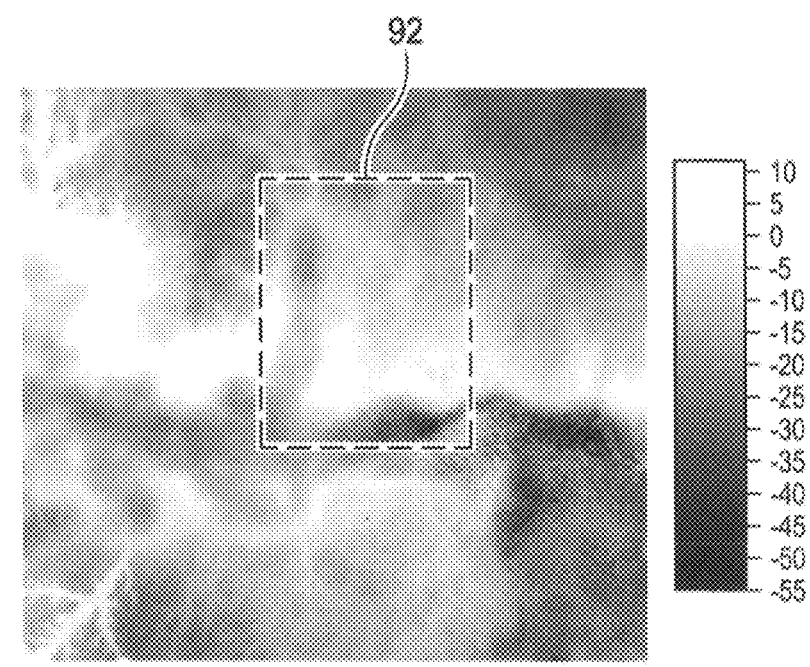

The input first break picks and the seismic dataset are the same in both cases and particular care has been exercised to repeat the pre-processing of the seismic traces using the same flows and parameters used for the benchmark dataset. Based on this, the differences observed in the final results are only related to the different procedures used for deriving the near surface solution. FIG. 9A displays a statics solution from the tomographic velocity field, as obtained by the conventional tomographic processing. FIG. 9B is a display of a statics solution obtained from CMP velocities (i.e. depth-converted time-offset functions) calculated in accordance with the present invention (the pseudo-3D velocity field of FIG. 8C) for the purposes of comparison with FIG. 9A. An associated numerical key indicates in common for FIGS. 9A and 9B the displayed amount of statics in ms.

An analysis of bordered areas of interest 90 and 92 at comparable locations within FIGS. 9A and 9B indicates that the statics of FIG. 9B obtained with the pseudo-3D velocity model are better representative of the expected subsurface geology of the wadi. This is inferred by looking at the seismic time slice of FIG. 8A. In most of the area, such as at 90 and 92, the wadi structure is better defined by the statistical approach (FIG. 9B) showing sharp edges and larger statics contrasts from inside/outside of the wadi.

Processing according to the present invention can result in larger statics corrections applied to the edges of the structure; one of the targets of the exploration. The southeast (SE) quadrant of the area of interest is characterized by dunes. This is another area where the two statics solutions show differences with the conventional tomographic solution (FIG. 9A) deriving much lower velocities than the solution according to the present invention (FIG. 9B).

Refraction Residual Statics Examples

Figure 10A:
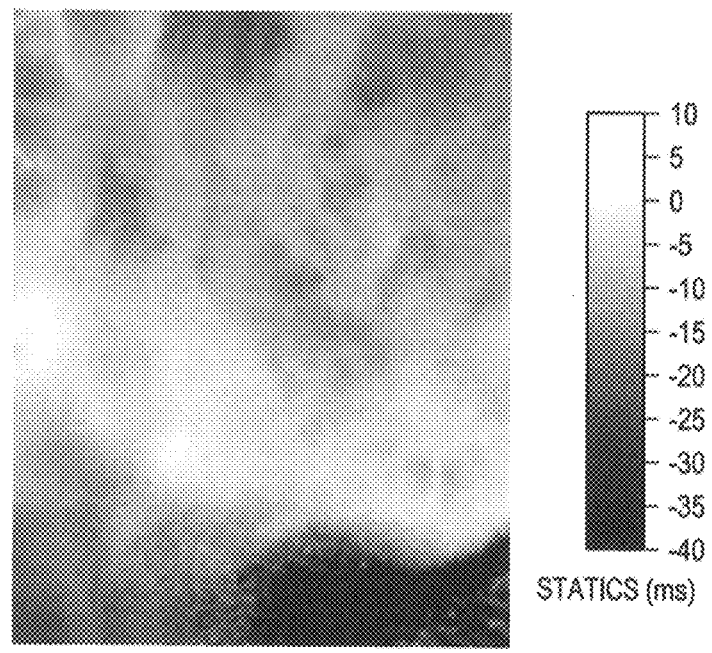
FIGS. 10A, 10B, 10C and 10D are plots of field statics according to tomographic velocity field processing compared against results obtained during successive stages of processing according to the present invention.
Figure 10B:
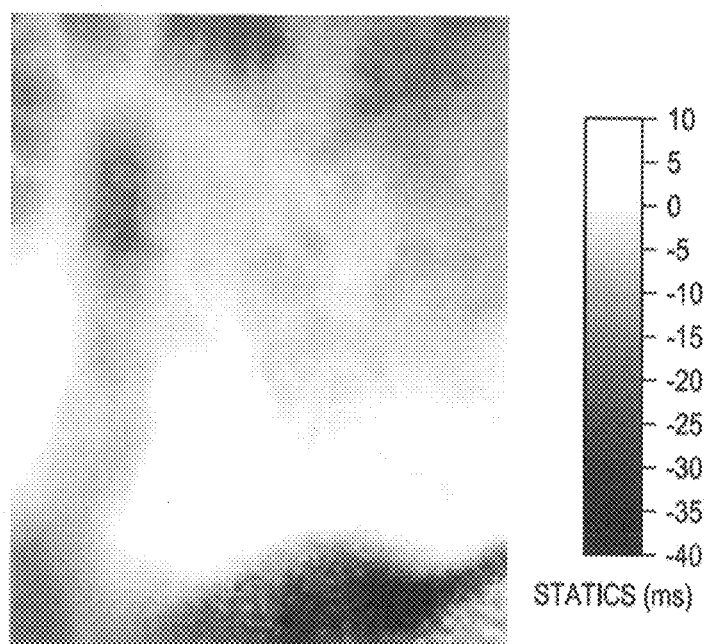

A second aspect of the surface-consistent refraction method deals with calculation of refraction residual statics which is applied to a subset of the area of interest in FIGS. 9A and 9B. The focus of determining refraction residual statics is on delineation of the edges of the wadi structure in an area of large lateral velocity contrasts. FIG. 10A is a plot of field static obtained from the benchmark tomographic model of FIG. 9A. Again, an associated numerical key is present for FIG. 10A as well as FIGS. 10B, 10C and 10D indicating statics values in ms. To perform refraction residual statics determination according to the present invention, trace data are first sorted in the XYO domain used for the initial first break analysis. FIG. 10B is a plot of field statics obtained from the statics solution obtained from the pseudo-3D velocity model of FIG. 9B. The field statics defined for FIG. 9B are used to shift the traces.

Figure 10C:
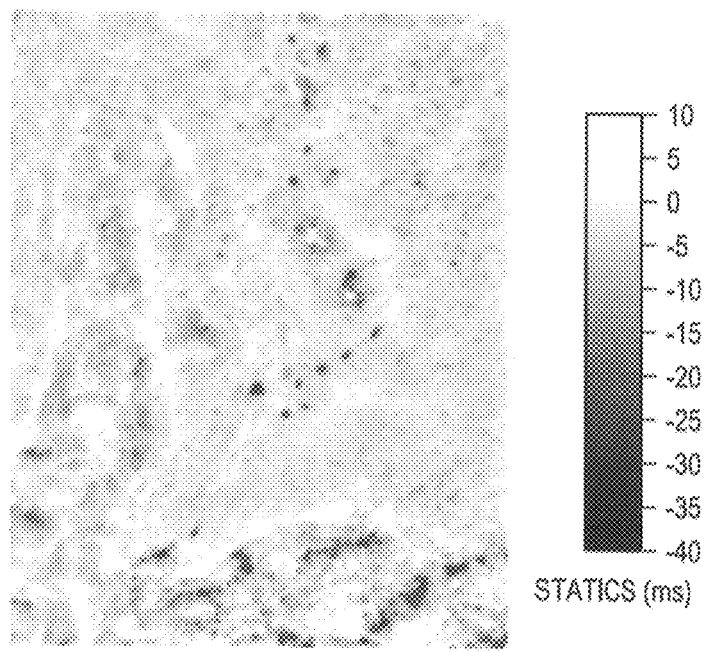
Figure 10D:
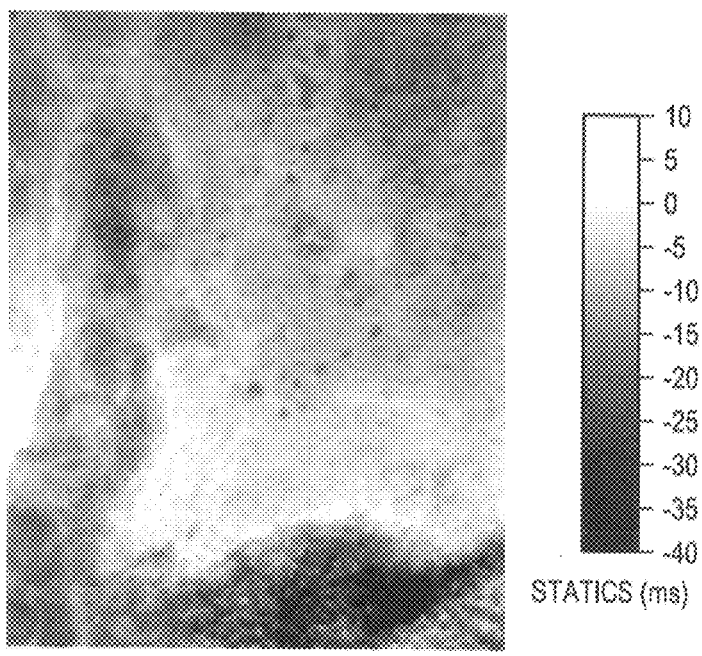

Cross-correlation of a pilot trace with all the other traces in the gather provides the time shifts that are inverted for surface-consistent statics. In each offset bin, traces are conveniently sorted in azimuth classes to enable the identification of trends related to 3D effects and/or to azimuthal anisotropy. FIG. 10C is a plot of surface-consistent refraction residual statics obtained as a result. The full solution of surface-consistent refraction statics model (field and refraction residual statics of FIGS. 10B and 10C, respectively) is shown by FIG. 10D.

The sharpness of the results obtained according to the present invention (FIG. 10D) is clearly visible and also correlates very well with the known and expected geology. The calculated surface-consistent refraction residual statics were obtained by removing the mean value during the estimation of the time shifts through cross-correlation. This procedure helps in preventing that subsurface velocity anomalies (3D velocity and/or anisotropy) leaking into the surface-consistent calculations. As a result, the refraction residual statics (FIG. 10C) range between −15 to 16 ms, a range consistent with values of residual statics typically found in seismic data processing.

Figure 11A:
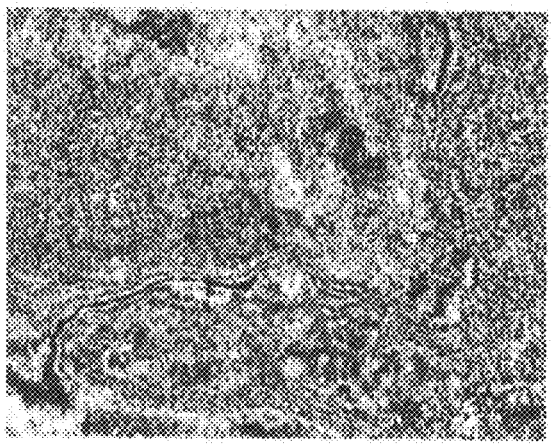
FIGS. 11A, 11B and 11C are plots of time slices according to application of statics models to seismic data compared against results obtained according to the present invention.
Figure 11B:
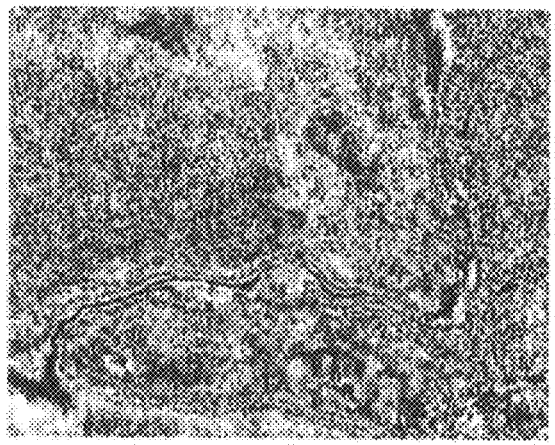
Figure 11C:
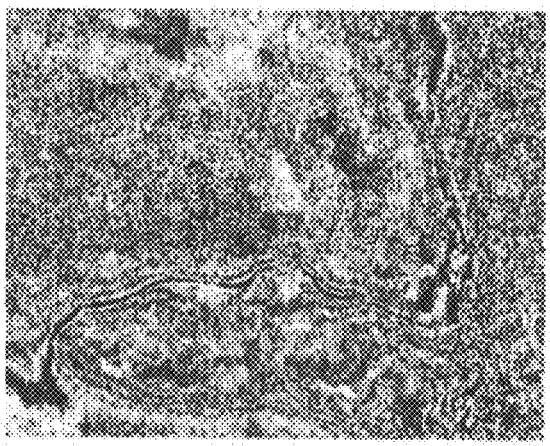
Figure 12C:
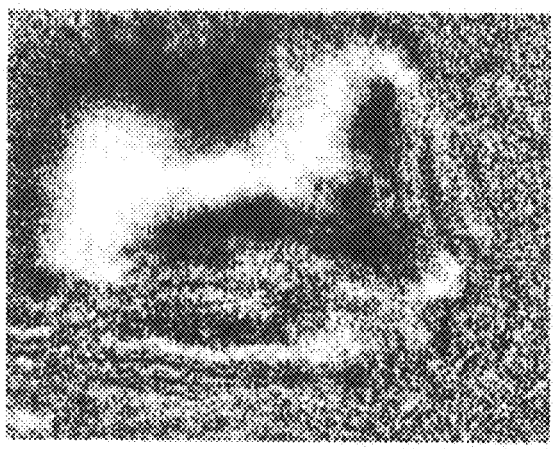
FIGS. 12A, 12B and 12C are another set of plots of time slices according to application of statics models to seismic data compared against results obtained according to the present invention.
Figure 12B:
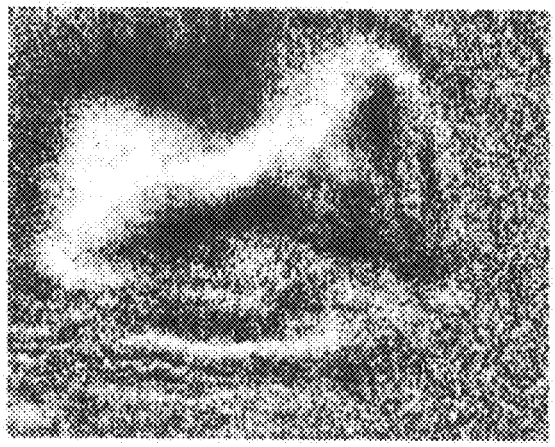
Figure 12A:
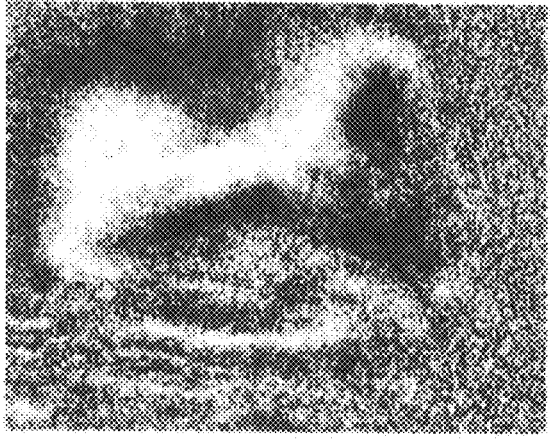

FIGS. 11A through 11C and FIGS. 12A through 12C are display of comparative results resulting from application of the different statics models to the seismic data is shown for two different time slices. The first time slice is a relatively shallow one at 464 ms (FIGS. 11A through 11C) and the other is a deeper time slice (at reservoir level) at 1440 ms (FIGS. 12A through 12C). The time slices of FIG. 11C and FIG. 12C represent results obtained from surface-consistent refraction statics according to the present invention. These results can be compared to FIG. 11A and FIG. 12A which are plots of results obtained from an elevation statics solution using a fixed replacement velocity of 3,250 m/s, and also compared with results from the benchmark statics solutions (FIG. 11B and FIG. 12B) obtained from the conventional independent tomographic approach.

Minimal processing is applied to the data at this stage with only two velocity analyses performed in the subarea, along with amplitude compensation, linear noise removal and deconvolution. The intent is to isolate the contributions to the seismic data of different statics models. Regardless of the time slice or cross-section analyzed, results in FIGS. 11C and 12C indicate that the surface-consistent refraction methodology according to the present invention provides better results in the three processing methods. A noticeable improvement in the continuity and stacking power of reflected events by surface-consistent refraction is observed over the simplest statics model (elevation statics) and the benchmark tomostatics solution. The boundaries of the wadi can be seen to come into focus and enable a better geometrical definition of the reservoir limits in the area.

Figure 13A:
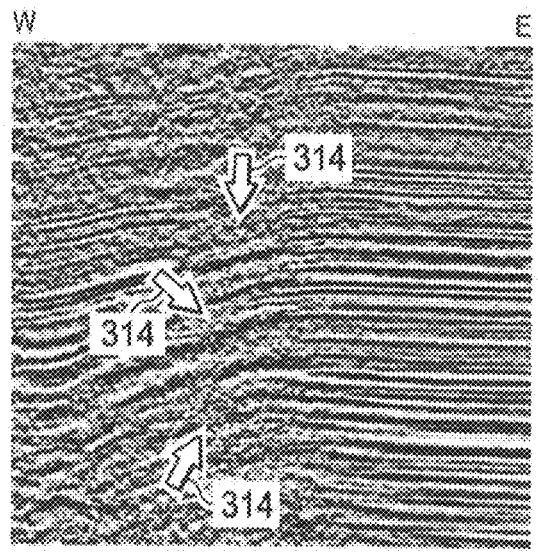
FIGS. 13A and 13B are plots of a seismic cross-line according to tomographic processing compared against results obtained according to the present invention.
Figure 13B:
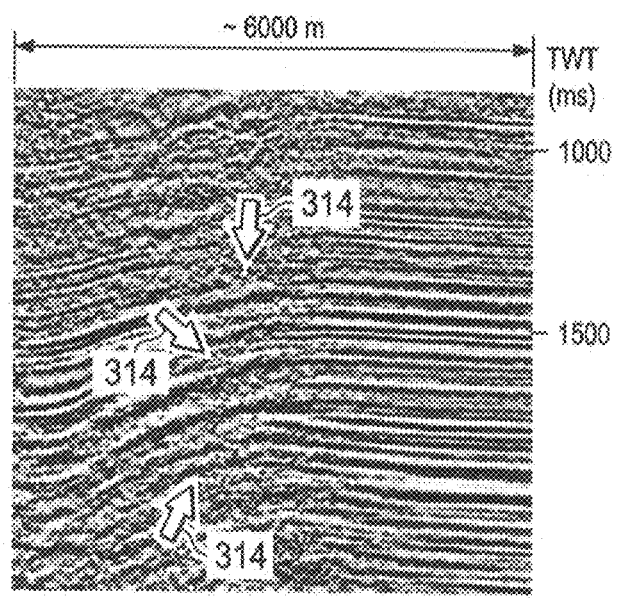

A further assessment is provided by comparing the effects of the total statics solution (refraction+reflection) obtained by the independent state-of-the-art tomographic benchmark approach with the results of statistical surface-consistent processing according to the present invention. The central portion of the wadi is displayed in FIGS. 13A and 13B, where it can be observed from the areas indicated by arrows 314 that results of processing (FIG. 13B) according to the present invention provides better results than the conventional tomographic approach (FIG. 13A) in the low S/N area and equivalent results in areas of good data quality. Similar conclusions are derived in every portion of the seismic volume analyzed with the surface-consistent refraction approach always providing equivalent of better results than the tomographic approach.

Advantages related to the refraction statics processing and analysis 104 as described in FIG. 4, and demonstrated in FIG. 11C and FIG. 12C, include that the seismic traces can show a better alignment of reflected events in the CMP gathers. This facilitates seismic velocity analysis and reduces the potential of cycle skips during the cross-correlation. Another advantage of the present invention is provided in subsurface areas characterized by noise in the seismic data. In such conditions it is considerably easier to identify and follow the phase of refracted events at relatively short offsets rather than trying to identify and cross-correlate the weak reflected events submerged within the noise. The surface-consistent refraction analysis according to the present invention provides a head start for the steps of reflection statics and velocity analysis.

Processing according to the present invention is fully automated. When coupled with automatic quality control and refinement of first break picks (as described in Applicants' commonly owned co-pending U.S. patent application Ser. No. 14/845,627, "Automatic Quality Control of Seismic Travel Time", filed Sep. 4, 2015), now U.S. Pat. No. 10,067,255, it becomes a powerful tool that can dramatically reduce the cycle time for the analysis of the near surface in seismic data processing. The full scalability of the methodology on distributed memory machines, with the intrinsic low computing requirements, makes the procedure very efficient. The near surface production cycle is estimated to be shortened by a factor of at least twenty of costly computing time with minimum human involvement.

The invention has been sufficiently described so that a person with average knowledge in the field of geophysics and seismic exploration methods may reproduce and obtain the results mentioned in the invention herein. Nonetheless, any skilled person in the field of technique, subject of the invention herein, may carry out modifications not described in the request herein, to apply these modifications to a determined structure and methodology, or in the use and practice thereof, requires the claimed matter in the following claims; such structures and processes shall be covered within the scope of the invention.

It should be noted and understood that there are improvements and modifications made of the present invention described in detail above without departing from the spirit or scope of the invention as set forth in the accompanying claims.

What is claimed is:

1. A method performed in a computer comprising a memory and a processor of forming measures of near surface corrections of seismic survey data in the form of a set of seismic survey traces obtained from records of seismic energy travel from seismic sources to an array of seismic detector geophones during a seismic survey, comprising the computer implemented steps of:
   storing in the memory computer operable instructions causing the computer to form the measures of near surface corrections of the seismic survey data;
   performing in the processor, under control of the stored computer operable instructions, steps to form measures of near surface corrections of seismic survey data comprising:
   (a) assembling in the computer a seismic trace first break dataset detected by the array of detector geophones during the seismic survey as a result of first arrival times at the detector geophones of seismic energy from the sources;
   (b) sorting the arrival times of the seismic trace first break dataset into offset bins of a travel time attribute cube according to common midpoints for refracted seismic wave travel between the seismic sources and individual ones of the detector geophones of the array, the common midpoints being organized into dimensional offsets of the detector geophones of the array;
   (c) removing anomalous arrival times from the sorted arrival times in the offset bins to form a refined first break dataset;
   (d) forming common midpoint velocity functions for the traces of the offset bins based on the refined first break dataset;
   (e) forming measures of field static corrections for traces of the offset bins based on the common midpoint velocity functions;
   (f) applying the measures of field statics corrections to the set of seismic survey traces to form a set of field statics corrected seismic traces;
   (g) forming measures of refraction residual statics corrections for the set of field statics corrected seismic traces; and
   (h) applying the measures of refraction residual statics corrections to the traces of set of field statics corrected seismic traces to form near surface corrected seismic traces.

2. The computer implemented method of claim 1, wherein the dimensional offsets of the detector geophones of the array comprise a common midpoint x axis of the seismic survey.

3. The computer implemented method of claim 2, wherein the dimensional offsets of the detector geophones of the array comprise a common midpoint y axis of the seismic survey.

4. The computer implemented method of claim 1, wherein the dimensional offsets of the detector geophones of the array comprise an offset axis.

5. The computer implemented method of claim 1, wherein the dimensional offsets of the detector geophones of the array comprise an azimuth axis.

6. The computer implemented method of claim 1, further including the processor, under control of the stored computer operable instructions, performing a step of forming a confidence indicator measure of the first break arrival times in individual ones of the offset bins of the travel time attribute cube.

7. The computer implemented method of claim 6, wherein the processor in performing the step of forming a confidence indicator measure further performs a step of storing the formed confidence indicator measure of the first break arrival times of the adjusted arrival trace dataset.

8. The computer implemented method of claim 1, further including the processor performing reflection processing on the near surface corrected seismic traces.

9. A data processing system forming measures of near surface corrections of seismic survey data in the form of a set of seismic survey traces obtained from records of seismic energy travel from seismic sources to an array of seismic detector geophones during a seismic survey, comprising:
   a memory storing computer operable instructions causing the data processing system to form the measures of near surface corrections of the seismic survey data;
   a processor performing under control of the computer operable instructions stored in the memory steps of:
   (a) assembling in the computer a seismic trace first break dataset detected by the array of detector geophones during the seismic survey as a result of first arrival times at the detector geophones of seismic energy from the sources;
   (b) sorting the arrival times of the seismic trace first break dataset into offset bins of a travel time attribute cube according to common midpoints for refracted seismic wave travel between the seismic sources and individual ones of the detector geophones of the array, the common midpoints being organized into dimensional offsets of the detector geophones of the array;
   (c) removing anomalous arrival times from the sorted arrival times in the offset bins to form a refined first break dataset;
   (d) forming common midpoint velocity functions for the traces of the offset bins based on the refined first break dataset;
   (e) forming measures of field static corrections for traces of the offset bins based on the common midpoint velocity functions;
   (f) applying the measures of field statics corrections to the set of seismic survey traces to form a set of field statics corrected seismic traces;
   (g) forming measures of refraction residual statics corrections for the set of field statics corrected seismic traces; and (h) applying the measures of refraction residual statics corrections to the traces of set of field statics corrected seismic traces to form near surface corrected seismic traces; and a memory receiving for storage the near surface corrected seismic traces.

10. The data processing system of claim 9, wherein the dimensional offsets of the detector geophones of the array comprise a common midpoint x axis of the seismic survey.

11. The data processing system of claim 10, wherein the dimensional offsets of the detector geophones of the array comprise a common midpoint y axis of the seismic survey.

12. The data processing system of claim 9, wherein the dimensional offsets of the detector geophones of the array comprise an offset axis.

13. The data processing system of claim 9, wherein the dimensional offsets of the detector geophones of the array comprise an azimuth axis.

14. The data processing system of claim 9, further including the processor under control of the computer operable instructions stored in the memory performing a step of forming a confidence indicator measure of the first break arrival times in individual ones of the offset bins of the travel time attribute cube.

15. The data processing system of claim 14, wherein the processor in performing the step of forming a confidence indicator measure further performs a step of storing the formed confidence indicator measure of the arrival times of the adjusted arrival trace dataset.

16. The data processing system of claim 9, further including the processor performing reflection processing on the near surface corrected seismic traces.

17. A data storage device having stored in a non-transitory computer readable medium computer operable instructions for causing a data processing system comprising a memory and a processor to form measures of near surface corrections of seismic survey data in the form of a set of seismic survey traces obtained from records of seismic energy travel from seismic sources to an array of seismic detector geophones during a seismic survey, the instructions stored in the data storage device causing the data processing system to perform the following steps:

storing in the memory computer operable instructions causing the data processing system to form the measures of near surface corrections of the seismic survey data;

performing in the processor, under control of the stored computer operable instructions, steps to form measures of near surface corrections of seismic survey data comprising:

(a) assembling in the computer a seismic trace first break dataset detected by the array of detector geophones during the seismic survey as a result of first arrival times at the detector geophones of seismic energy from the sources;

(b) sorting the arrival times of the seismic trace first break dataset into offset bins of a travel time attribute cube according to common midpoints for refracted seismic wave travel between the seismic sources and individual ones of the detector geophones of the array, the common midpoints being organized into dimensional offsets of the detector geophones of the array;

(c) removing anomalous arrival times from the sorted arrival times in the offset bins to form refined a first break dataset;

(d) forming common midpoint velocity functions for the traces of the offset bins based on the refined first break dataset;

(e) forming measures of field static corrections for traces of the offset bins based on the common midpoint velocity functions;

(f) applying the measures of field statics corrections to the set of seismic survey traces to form a set of field statics corrected seismic traces;

(g) forming measures of refraction residual statics corrections for the set of field statics corrected seismic traces; and (h) applying the measures of refraction residual statics corrections to the traces of set of field statics corrected seismic traces to form near surface corrected seismic traces.

18. The data storage device of claim 17, wherein the dimensional offsets of the detector geophones of the array comprise a common midpoint x axis of the seismic survey.

19. The data storage device of claim 18, wherein the dimensional offsets of the detector geophones of the array comprise a common midpoint y axis of the seismic survey.

20. The data storage device of claim 17, wherein the dimensional offsets of the detector geophones of the array comprise an offset axis.

21. The data storage device of claim 17, wherein the dimensional offsets of the detector geophones of the array comprise an azimuth axis.

22. The data storage device of claim 17, wherein the instructions further comprise instructions for a step of forming a confidence indicator measure of the first break arrival times in individual ones of the offset bins of the travel time attribute cube.

23. The data storage device of claim 22, wherein the instructions for the step of forming a confidence indicator measure further comprise instructions for storing the confidence indicator measure of the arrival times of the adjusted arrival trace dataset.

24. The data storage device of claim 17, wherein the instructions further comprise instructions for performing reflection processing on the near surface corrected seismic traces.

* * * * *